US010153861B2

United States Patent
Nagarajan et al.

(10) Patent No.: US 10,153,861 B2
(45) Date of Patent: Dec. 11, 2018

(54) DIGITAL LINK VIEWER FOR DATA CENTER INTERCONNECT NODES

(71) Applicant: Infinera Corporation, Sunnyvale, CA (US)

(72) Inventors: Karthikeyan Mathruboodham Nagarajan, Bangalore (IN); Ravindarreddy Ankireddy, Krishna (IN); Kasi Viswanadham Pydi, Bangalore (IN); Yashpal Kumar, Bangalore (IN); Musab Qamri, Karwar (IN)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 14/879,953

(22) Filed: Oct. 9, 2015

(65) Prior Publication Data

US 2017/0033864 A1 Feb. 2, 2017

(51) Int. Cl.
*H04B 10/00* (2013.01)
*H04B 10/20* (2006.01)
*H04J 14/02* (2006.01)
*H04J 14/08* (2006.01)
*H04L 12/54* (2013.01)
*H04B 10/077* (2013.01)

(52) U.S. Cl.
CPC ...... *H04J 14/0267* (2013.01); *H04B 10/0773* (2013.01); *H04B 10/077* (2013.01); *H04J 14/02* (2013.01); *H04J 14/08* (2013.01); *H04L 12/54* (2013.01)

(58) Field of Classification Search
CPC .... H04B 10/0795; H04B 10/27; H04B 10/03; H04B 10/0771; H04B 10/0777; H04J 14/02; H04J 14/0221; H04J 14/0212

USPC ...................................... 398/25, 135, 58, 79
See application file for complete search history.

(56) References Cited

U.S. PATENT DOCUMENTS

| | | | | | |
|---|---|---|---|---|---|
| 5,677,905 | A | * | 10/1997 | Bigham | H04H 20/38 348/E7.071 |
| 5,740,075 | A | * | 4/1998 | Bigham | H04L 12/66 340/1.1 |
| 5,917,537 | A | * | 6/1999 | Lightfoot | H04L 69/329 348/E7.06 |

(Continued)

OTHER PUBLICATIONS

U.S. Appl. No. 14/514,801, filed Oct. 2014, Nagarajan et al.

*Primary Examiner* — Ken N Vanderpuye
*Assistant Examiner* — Abbas H Alagheband
(74) *Attorney, Agent, or Firm* — David L. Soltz

(57) ABSTRACT

A device may receive optical network information associated with a first optical node and a second optical node. The first optical node may be associated with a first group of optical devices. The second optical node may be associated with a second group of optical devices. The device may identify a first mapping in which a first group of optical channels is associated with the first group of optical devices and a second mapping in which a second group of optical channels is associated with the second group of optical devices. The first group of optical channels may correspond to the first group of payloads, and the second group of optical channels may correspond to the second group of payloads. The device may provide information depicting the first mapping and information depicting the second mapping.

12 Claims, 17 Drawing Sheets

(56) References Cited

U.S. PATENT DOCUMENTS

| Patent/Pub. No. | Date | Inventor | Classification |
|---|---|---|---|
| 6,466,572 B1 * | 10/2002 | Ethridge | H04B 10/272 370/352 |
| 6,850,660 B2 * | 2/2005 | Notani | H04J 14/0201 370/222 |
| 7,149,975 B1 * | 12/2006 | Johnson | H04L 41/22 715/734 |
| 7,173,936 B1 * | 2/2007 | Semaan | H04J 3/085 370/395.51 |
| 7,185,075 B1 * | 2/2007 | Mishra | H04L 41/00 379/207.01 |
| 7,286,487 B2 * | 10/2007 | Perkins | H04J 3/07 370/253 |
| 7,450,497 B2 * | 11/2008 | Trudel | H04J 3/085 370/224 |
| 7,539,196 B2 * | 5/2009 | Flavin | H04J 3/1611 370/394 |
| 7,684,399 B2 * | 3/2010 | Perkins | H04J 3/07 370/389 |
| 8,503,470 B2 * | 8/2013 | Narvaez | H04J 3/062 370/419 |
| 8,554,901 B2 * | 10/2013 | Allan | H04L 41/0873 709/223 |
| 8,625,984 B2 * | 1/2014 | Matsukawa | H04B 10/0793 398/17 |
| 8,687,959 B2 * | 4/2014 | Muppidi | H04B 10/0773 398/30 |
| 9,178,713 B1 * | 11/2015 | Johnston | H04L 7/0075 |
| 9,301,026 B2 * | 3/2016 | Srinivas | H04Q 3/0083 |
| 9,397,898 B2 * | 7/2016 | Huliyar | H04B 10/07 |
| 9,461,942 B2 * | 10/2016 | Narvaez | H04J 3/062 |
| 9,654,933 B2 * | 5/2017 | Guagenti | H04J 14/08 |
| 2002/0015405 A1 * | 2/2002 | Sepponen | H04L 1/0085 370/389 |
| 2002/0097743 A1 * | 7/2002 | Baydar | H04J 3/1611 370/463 |
| 2003/0120799 A1 * | 6/2003 | Lahav | H04J 3/1611 709/236 |
| 2003/0228093 A1 * | 12/2003 | Notani | H04J 14/0201 385/24 |
| 2009/0304381 A1 * | 12/2009 | Muppidi | H04B 10/0773 398/34 |
| 2010/0254709 A1 * | 10/2010 | Narvaez | H04J 3/062 398/98 |
| 2011/0135301 A1 * | 6/2011 | Myslinski | H04B 10/572 398/34 |
| 2011/0158658 A1 * | 6/2011 | Myslinski | H04B 10/572 398/208 |
| 2012/0302185 A1 * | 11/2012 | Hotta | H04B 17/004 455/119 |
| 2012/0321310 A1 * | 12/2012 | Spock | H04J 14/00 398/59 |
| 2013/0108273 A1 * | 5/2013 | Valiveti | H04J 3/1652 398/79 |
| 2013/0302028 A1 * | 11/2013 | Barnard | H04B 10/572 398/25 |
| 2013/0315258 A1 * | 11/2013 | Narvaez | H04J 3/062 370/409 |
| 2014/0006956 A1 * | 1/2014 | Huliyar | H04B 10/07 715/736 |
| 2015/0033137 A1 * | 1/2015 | Nagarajan | H04L 41/22 715/736 |
| 2015/0095787 A1 * | 4/2015 | Bhaskara | H04L 41/22 715/735 |
| 2015/0229422 A1 * | 8/2015 | Guagenti | H04J 14/08 398/35 |
| 2015/0365193 A1 * | 12/2015 | Connolly | H04L 41/0803 398/52 |
| 2016/0112253 A1 * | 4/2016 | Nagarajan | H04L 41/0853 715/734 |
| 2016/0112277 A1 * | 4/2016 | Nagarajan | H04L 41/12 715/736 |
| 2016/0119075 A1 * | 4/2016 | Gareau | H04B 10/27 398/58 |
| 2016/0119076 A1 * | 4/2016 | Gareau | H04L 12/66 398/49 |
| 2016/0156413 A1 * | 6/2016 | Fu | H04J 14/0227 398/58 |
| 2016/0182275 A1 * | 6/2016 | Viswanadham | H04B 10/0771 398/1 |

* cited by examiner

DIGITAL LINK VIEWER FOR DATA CENTER INTERCONNECT NODES

RELATED APPLICATION

This application claims priority under 35 U.S.C. § 119 to Indian Provisional Patent Application No. 3926/CHE/2015, filed on Jul. 30, 2015, the content of which is incorporated by reference herein in its entirety.

BACKGROUND

In optical networks, signals may be transmitted at various wavelengths, with each wavelength corresponding to a transmission channel. Optical links may connect network nodes so that signals may be transmitted throughout the optical network. An optical route may use a series of network nodes and optical links to connect a source of an optical transmission with a destination for the optical transmission.

SUMMARY

According to some possible implementations, a device may receive optical network information associated with a first optical node and a second optical node. The first optical node may be associated with a first group of optical devices corresponding to a first group of payloads. The second optical node may be associated with a second group of optical devices corresponding to a second group of payloads. The device may identify a first mapping in which a first group of optical channels is associated with the first group of optical devices. The first group of optical channels may carry the first group of payloads from the first group of optical devices. The device may identify a second mapping in which a second group of optical channels is associated with the second group of optical devices. The second group of optical channels may carry the second group of payloads from the second group of optical devices. The device may determine alert information that identifies whether there is a communication mismatch between the first group of optical devices and the second group of optical devices. The device may provide, for display, information depicting the first mapping, information depicting the second mapping, and the alert information.

According to some possible implementations, a non-transitory computer-readable medium may store instructions that, when executed by a processor, may cause the processor to receive optical network information associated with a first optical node and a second optical node. The first optical node may be associated with a first group of optical devices corresponding to a first group of payloads. The first optical node may be associated with the second optical node. The second optical node may be associated with a second group of optical devices corresponding to a second group of payloads. The instructions may cause the processor to identify a first mapping in which a first group of optical channels is associated with the first group of optical devices. The first group of optical channels may correspond to the first group of payloads from the first group of optical devices. The instructions may cause the processor to identify a second mapping in which a second group of optical channels is associated with the second group of optical devices. The second group of optical channels may correspond to the second group of payloads from the second group of optical devices. The instructions may cause the processor to provide information to depict the first mapping between the first group of optical devices and the first group of optical channels associated with the first optical node. The information to depict the first mapping may cause the first mapping to be provided for display via a user interface. The instructions may cause the processor to provide information to depict the second mapping between the second group of optical devices and the second group of optical channels associated with the second optical node. The information to depict the second mapping may cause the second mapping to be provided for display via the user interface concurrently with the first mapping being provided for display via the user interface.

According to some possible implementations, a method may include receiving, by a device, optical network information associated with a first optical node and a second optical node. The first optical node may be associated with a first group of optical devices, corresponding to a first group of payloads. The first optical node may be associated with the second optical node. The second optical node may be associated with a second group of optical devices corresponding to a second group of payloads. The method may include identifying, by the device, a first mapping in which a first group of optical channels is associated with the first group of optical devices. The first group of optical channels may be provisioned to carry the first group of payloads from the first group of optical devices. The method may include identifying, by the device, a second mapping in which a second group of optical channels is associated with the second group of optical devices. The second group of optical channels may be provisioned to carry the second group of payloads from the second group of optical devices. The method may include providing, for display and by the device, information depicting the first mapping that is associated with the first optical node. The method may include providing, for display and by the device, information depicting the second mapping that is associated with the second optical node. The method may include identifying, by the device, an alert associated with the first optical node or the second optical node based on the first mapping and the second mapping. The method may include providing, for display and by the device, information depicting the alert.

DETAILED DESCRIPTION

Figure 1A:
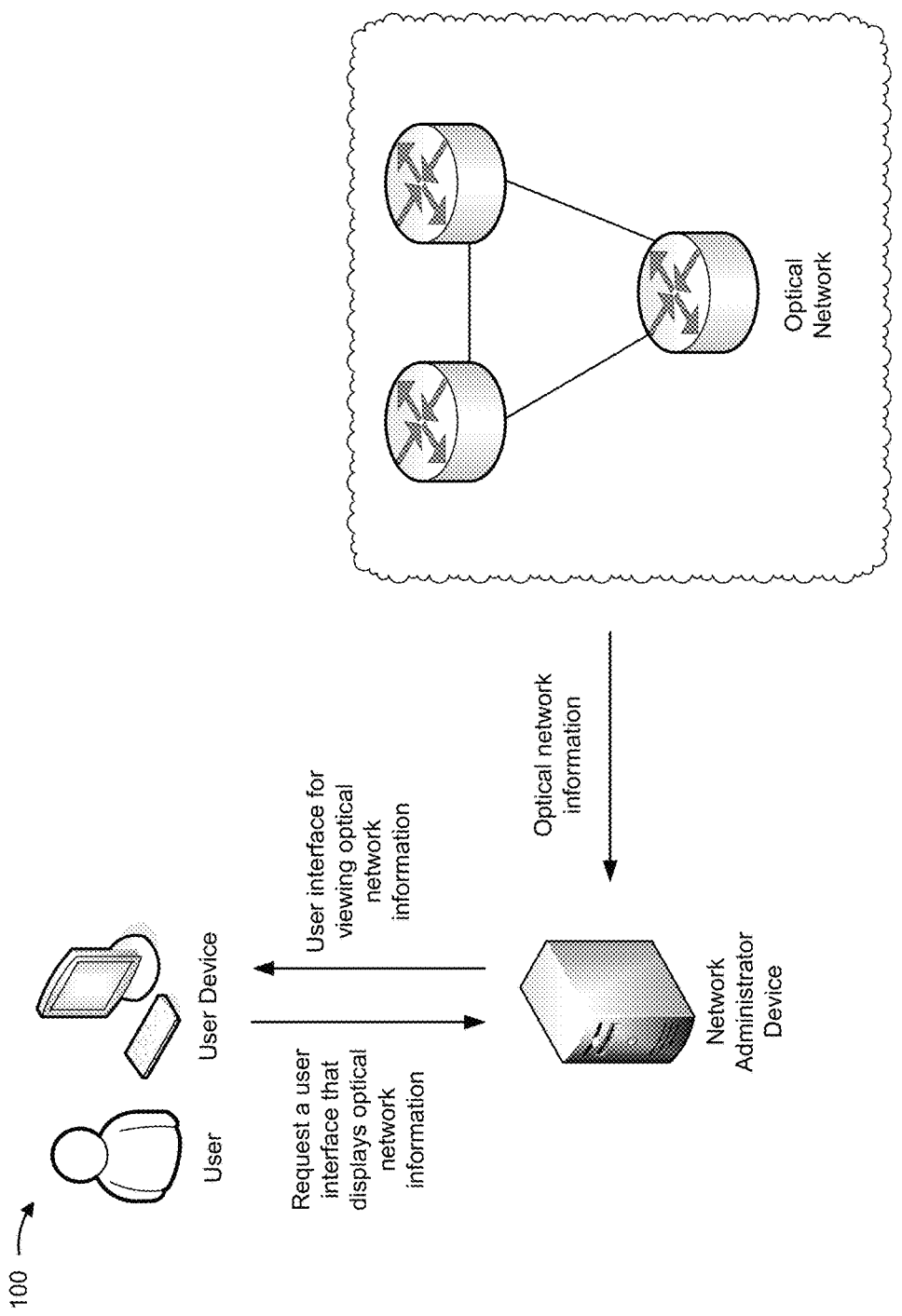
FIGS. 1A and 1B are diagrams of an overview of an example implementation described herein.

The following detailed description of example implementations refers to the accompanying drawings. The same reference numbers in different drawings may identify the same or similar elements.

Administrators and/or users of an optical network may want to determine information associated with the optical network, such as diagnostic information that may be used to diagnose and/or correct problems associated with the optical network. Optical network information may include a wide variety of information, such as information associated with an optical link, an optical node (e.g., at a data center, such as a data center interconnect node), an optical component, an optical super-channel, an optical channel, or the like.

An optical super-channel may include multiple optical channels multiplexed together, using wavelength-division multiplexing, for transmission as a single optical channel. A difference between an optical super-channel and a wavelength division multiplexed (WDM) signal is the channel gap. With an optical super-channel, the channel gap between optical channels is reduced relative to a WDM signal (i.e., the optical channels are more tightly packed in a super-channel than a WDM signal). The channel gap, for an optical super-channel, may be approximately equal to the Nyquist bandwidth (i.e., a channel gap that approximates the baud rate). Such a channel gap can be achieved with techniques, such as orthogonal-band-multiplexed (OBM)-orthogonal frequency division multiplexing (OFDM), no guard interval (NGI)-OFDM, Nyquist WDM, multi-channel equalization (MCE)-WDM, or the like.

In some implementations, an optical super-channel may be generated using a single line card. In some implementations, an optical super-channel may be generated using a single chip. In some implementations, an optical super-channel may be generated using a single photonic integrated circuit (PIC). In some implementations, an optical super-channel may be generated using a single PIC on a single line card with a single fiber-optic connector. In some implementations, an optical super-channel may be used with coherent modulation. In some implementations, an optical super-channel may be provisioned in a single operational cycle. Various quantities of the optical channels may be combined into optical super-channels using various modulation formats to create different optical super-channel types having different characteristics. Each optical channel may originate from a respective optical source (e.g., a laser source) and possibly a respective optical modulator. The use of optical super-channels enables scale, ease of deployment, and more efficient use of spectrum. Optical super-channels are discussed in more detail below in connection with FIGS. 2A and 2C.

A data center interconnect node may include an optical node associated with a data center. A data center may include a facility that houses computer systems and associated devices, such as telecommunication devices, storage devices, cloud computing devices, or the like. The data center interconnect node may include one or more optical connections to one or more client devices. The data center interconnect node may receive a payload from or send a payload to the one or more client devices as an optical signal. In some implementations, data center interconnect nodes may be linked to one another through an optical link ((e.g., a point-to-point optical connection), but there may be limited optical network information available, to administrators of an operator network, about characteristics of the optical link ((e.g., an optical power of an optical channel, a modulation type of an optical channel, etc.), because the optical link (may have no direct connection to a network administrator device (e.g., the optical link (may connect the two data center interconnect nodes with no optical node in between).

Implementations described herein provide a user interface with different sections for presenting optical network information relating to the data center interconnect nodes. In particular, implementations described herein provide a user interface for presenting optical network information associated with a communication mismatch associated with optical nodes that directly link data centers (e.g., data center interconnect nodes). This communication mismatch may relate to, among other things, a capacity mismatch (e.g., one optical node transmits at a first data rate and the other optical node receives at a second (different) data rate), a wavelength mismatch (e.g., one optical node is configured to use a first optical channel group and the other optical node is configured to use a second (different) optical channel group), and/or a modulation mismatch (e.g., one optical node is configured to use a first modulation format and the other optical node is configured to use a second (different) modulation format). The optical network information may be presented, within the user interface, in a manner that aids an operator in identifying and addressing the communication mismatch. For example, the optical network information may be presented, within the user interface, so as to stand out from other information that may also be present. This may be accomplished in many different ways, such as by using a highlighting technique, by using a font that is visually distinguishable from other fonts present in the user interface, or the like.

Figure 1B:
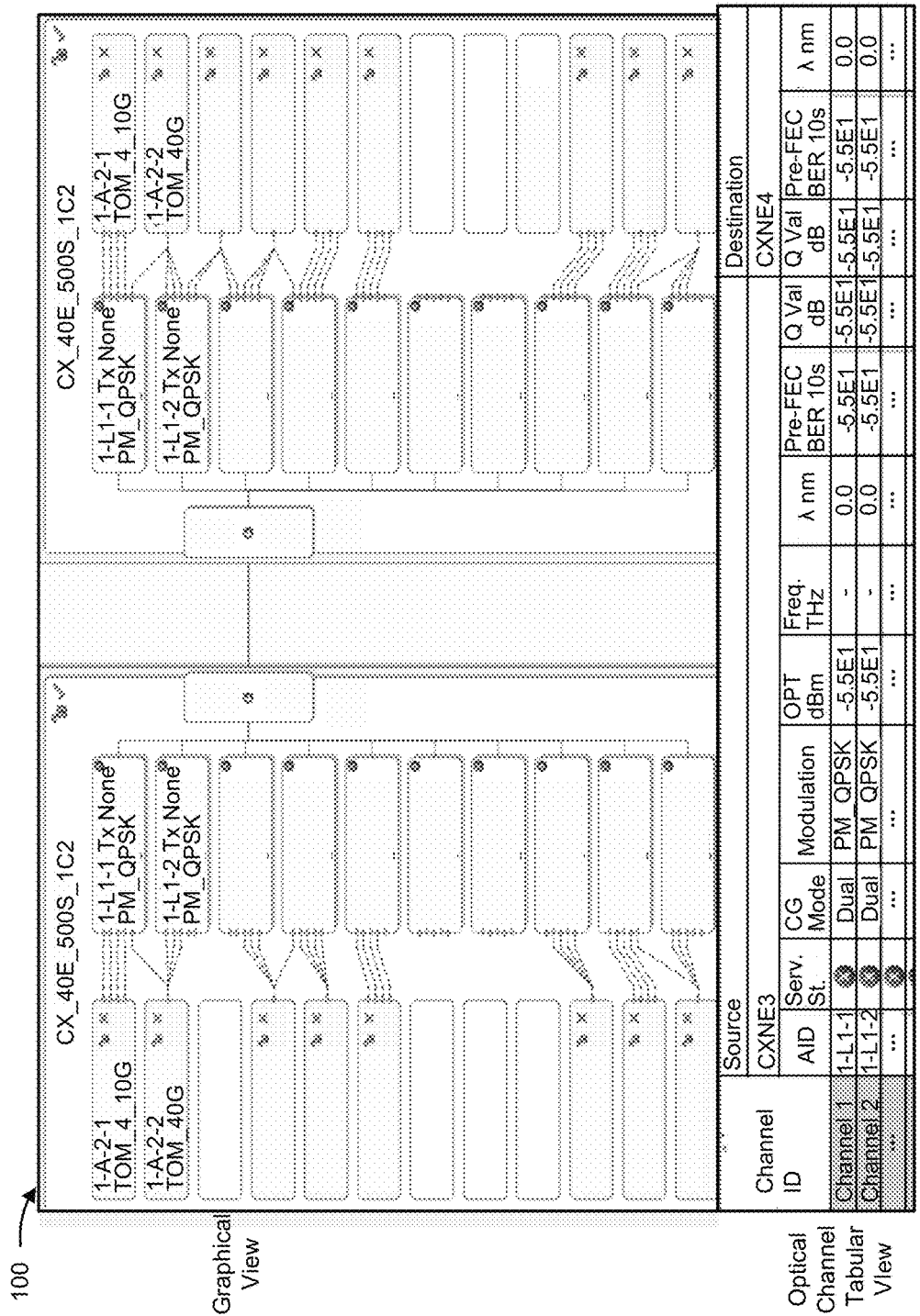

FIGS. 1A and 1B are diagrams of an overview of an example implementation 100 described herein. As shown in FIG. 1A, a user interacting with a user device (e.g., a desktop computer, a laptop computer, etc.) may request, from a network administrator device (e.g., a server, a network device, etc.), a user interface that displays optical network information. The network administrator device may request the optical network information from one or more optical nodes, such as a data center interconnect node, or optical links in an optical network. The network administrator device may receive the requested optical network information from the optical nodes or the optical links (or may retrieve the requested optical network information from memory), and may provide the user interface to the user device.

As shown in FIG. 1B, the user device may provide the requested optical network information via the user interface. As further shown, the user device may provide optical network information associated with a first data center (e.g., an optical node with one or more optical connections to client devices) and a second data center. The user interface may provide the optical network information in different views. For example, the user interface may include a summary view (e.g., a "Graphical View") that provides high level information relating to the optical nodes, and/or optical channels of the first data center and the second data center. The summary view displays representations of optical nodes and representations of optical channels or optical super-channels, of the first data center and the second data center, and displays relationships between the optical nodes and the optical channels through links. The optical nodes may be data center interconnect nodes that directly connect the first data center and the second data center (e.g., without any intermediate nodes).

As further shown in FIG. 1B, the user interface may include a channel view (e.g., an "Optical Channel Tabular View") that provides channel information relating to one or more optical channels (e.g., optical carriers) or optical super-channels included in an optical channel group of the first data center and the second data center. For example, channel information may identify an optical channel, an optical power, a modulation type, or the like.

Implementations described herein provide a user interface with optical network information associated with optical nodes that directly connect data centers. The optical network information associated with the data centers may include information associated with payloads, of one or more client devices, that are being input or output to the optical network. The optical network information may be presented to an operator in an easy-to-understand manner by visually identifying information that the operator may use to determine if the optical network is correctly configured or is experiencing a communication mismatch. This permits the operator to troubleshoot and repair issues in the optical network, thereby improving the operation of the optical network and of optical devices operating in the optical network. Furthermore, implementations described herein provide input mechanisms for the user to help the user find relevant optical network information.

Figure 2A:
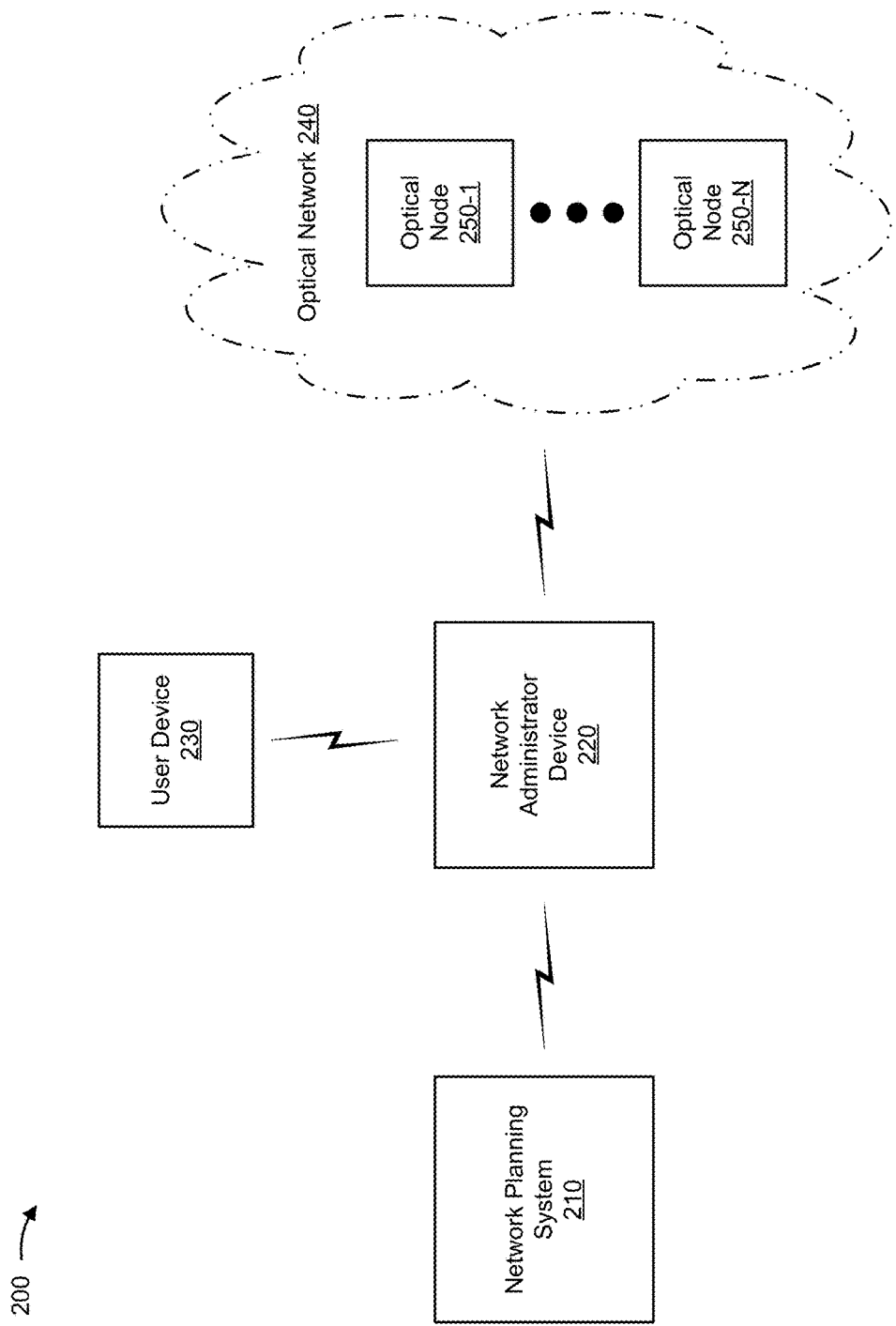
FIG. 2A is a diagram of an example environment in which systems and/or methods, described herein, may be implemented.

FIG. 2A is a diagram of an example environment 200 in which systems and/or methods, described herein, may be implemented. As shown in FIG. 2A, environment 200 may include a network planning system 210, a network administrator device 220, a user device 230, and an optical network 240, which may include a set of optical nodes 250-1 through 250-N (N≥1) (hereinafter referred to individually as "optical node 250," and collectively as "optical nodes 250"). Devices of environment 200 may interconnect via wired connections, wireless connections, or a combination of wired and wireless connections.

Network planning system 210 may include one or more devices capable of receiving, generating, storing, processing, and/or providing optical network information. For example, network planning system 210 may include a computing device, such as a server or a similar type of device. Network planning system 210 may assist a user in modeling and/or planning an optical network, such as optical network 240. For example, network planning system 210 may assist in modeling and/or planning an optical network configuration, which may include quantities, locations, capacities, parameters, and/or configurations of optical nodes 250, characteristics and/or configurations (e.g., capacities) of optical links between optical nodes 250, traffic demands of optical nodes 250 and/or optical links between optical nodes 250, and/or any other network information associated with optical network 240 (e.g., optical node configurations, digital device configurations, etc.). Network planning system 210 may provide optical network information, associated with optical network 240, to network administrator device 220 so that a user may view, modify, and/or interact with the optical network information.

Network administrator device 220 may include one or more devices capable of receiving, generating, storing, processing, and/or providing optical network information. For example, network administrator device 220 may include a computing device, such as a server, a desktop computer, a laptop computer, or the like. In some implementations, network administrator device 220 may receive optical network information (e.g., from one or more devices shown in FIG. 2A), and may provide the optical network information for display via a user interface. Additionally, or alternatively, network administrator device 220 may provide the optical network information to another device, such as user device 230, for display via a user interface. In some implementations, network administrator device 220 may receive (e.g., from user device 230) information associated with a modification to optical network 240, and may provide information associated with the modification to optical network 240 and/or optical nodes 250 to configure optical network 240 based on the modification.

User device 230 may include one or more devices capable of receiving, generating, storing, processing, and/or providing optical network information. For example, user device 230 may include a computing device, such as a desktop computer, a laptop computer, a tablet computer, a mobile phone (e.g., a smart phone, a radiotelephone, etc.), a hand-held computer, or the like. In some implementations, user device 230 may receive optical network information from and/or transmit information to another device in environment 200. User device 230 may provide the optical network information for display via different sections of a user interface, and may provide an input mechanism for a user to navigate between different levels of optical network information provided via the different sections. In some implementations, user device 230 may receive user input to modify optical network information, and may provide the modified optical network information to an optical node 250 (e.g., via network administrator device 220) to cause the modification to be implemented in optical network 240.

Optical network 240 may include any type of network that uses light as a transmission medium. For example, optical network 240 may include a fiber-optic based network, an optical transport network, a light-emitting diode network, a laser diode network, an infrared network, and/or a combination of these or other types of optical networks. Optical network 240 may include one or more optical routes (e.g., optical lightpaths), that may specify a path along which light is carried (e.g., using one or more optical links) between two or more optical nodes 250. An optical link may include an optical fiber, an optical channel, an optical super-channel, a super-channel group, an optical carrier group, a set of spectral slices, an optical control channel, an optical data channel, or the like.

In some implementations, an optical link may include a set of spectral slices. A spectral slice (a "slice") may represent a spectrum of a particular size in a frequency band (e.g., 12.5 gigahertz ("GHz"), 6.25 GHz, etc.). For example, a 4.8 terahertz ("THz") frequency band may include 384 spectral slices, where each spectral slice may represent 12.5 GHz of the 4.8 THz spectrum. A super-channel may include a different quantity of spectral slices depending on the super-channel type.

Optical node 250 may include one or more devices capable of receiving, generating, storing, processing, and/or providing data, carried by an optical signal, via an optical link. For example, optical node 250 may include one or more optical data processing and/or optical traffic transfer devices, such as a data center interconnect node, an optical amplifier (e.g., a doped fiber amplifier, an erbium doped fiber amplifier, a Raman amplifier, etc.), an optical add-drop multiplexer ("OADM") (e.g., a reconfigurable optical add-drop multiplexer ("ROADM"), a flexibly reconfigurable optical add-drop multiplexer ("FROADM"), etc.), an optical source device (e.g., a laser source), an optical destination device (e.g., a laser sink), an optical multiplexer, an optical demultiplexer, an optical transmitter, an optical receiver, an optical transceiver, a photonic integrated circuit, an integrated optical circuit, or the like. In some implementations, optical node 250 may include one or more optical components. Optical node 250 may process and/or transmit an optical signal (e.g., to other optical node 250 via an optical link) to deliver the optical signal through optical network 240. In some implementations, optical node 250 may include a data center interconnect node that directly connects a first data center with a second data center through a point-to-point optical connection.

The number and arrangement of devices and networks shown in FIG. 2A are provided as an example. In practice, there may be additional devices and/or networks, fewer devices and/or networks, different devices and/or networks, or differently arranged devices and/or networks than those shown in FIG. 2A. Furthermore, two or more devices shown in FIG. 2A may be implemented within a single device, or a single device shown in FIG. 2A may be implemented as multiple, distributed devices. Additionally, or alternatively, a set of devices (e.g., one or more devices) of environment 200 may perform one or more functions described as being performed by another set of devices of environment 200.

Figure 2B:
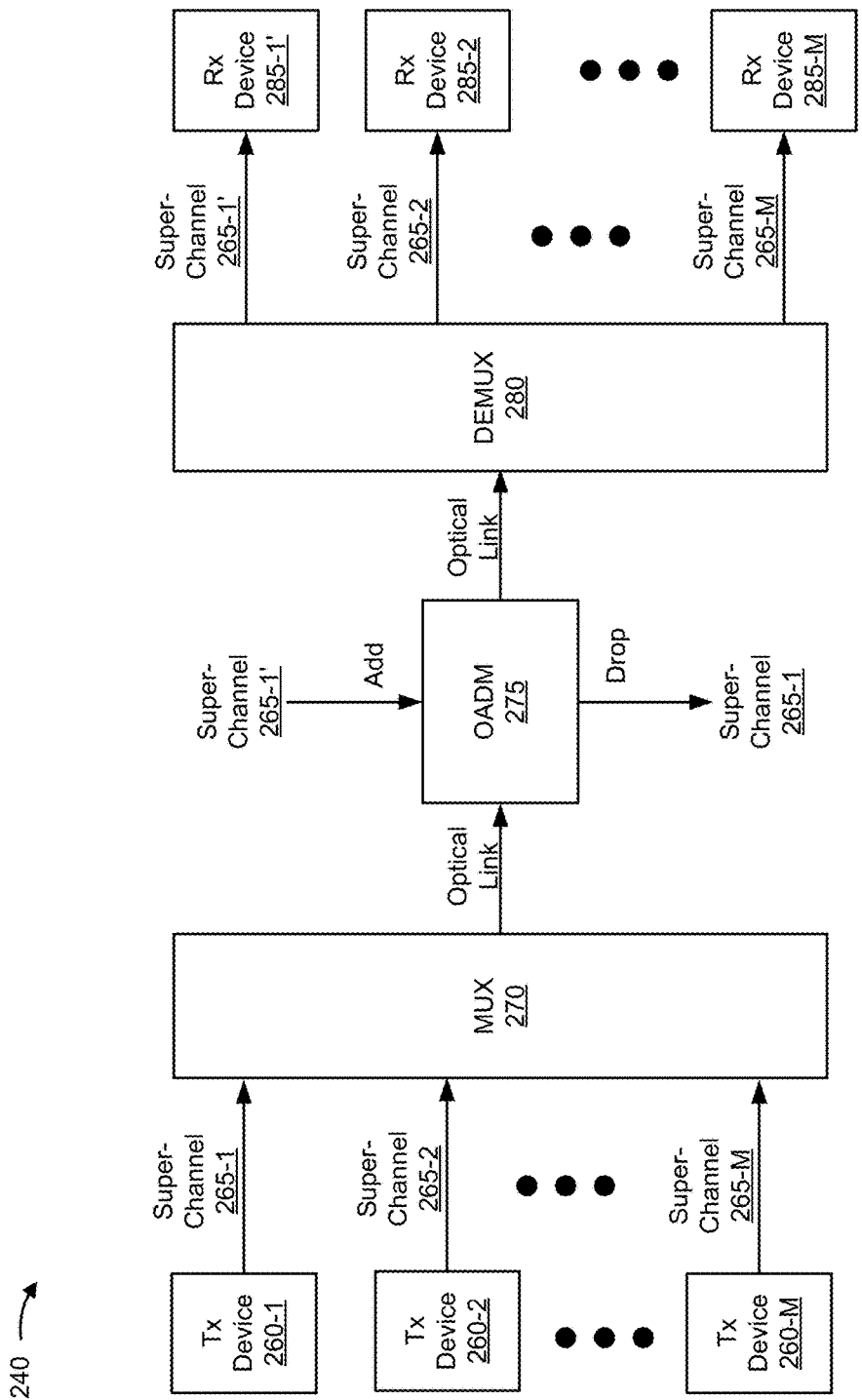
FIG. 2B is a diagram of example devices of an optical network that may be monitored and/or configured according to implementations described herein.

FIG. 2B is a diagram of example devices of optical network 240 that may be monitored and/or configured according to implementations described herein. One or more devices shown in FIG. 2B may operate within optical network 240, and may correspond to one or more optical nodes 250 and/or one or more optical components of an optical node 250. As shown, optical network 240 may include a set of optical transmitter devices 260-1 through 260-M (M≥1) (hereinafter referred to individually as "Tx device 260," and collectively as "Tx devices 260"), a set of super-channels 265-1 through 265-M (M≥1) (hereinafter referred to individually as "super-channel 265," and collectively as "super-channels 265"), a multiplexer ("MUX") 270, an OADM 275, a demultiplexer ("DEMUX") 280, and one or more optical receiver devices 285-1 through 285-M (M≥1) (hereinafter referred to individually as "Rx device 285," and collectively as "Rx devices 285").

Tx device 260 may include, for example, an optical transmitter and/or an optical transceiver that generates an optical signal. In some implementations, Tx device 260 may include an optical modulator that modulates the optical signal. In some implementations, Tx device 260 may include an optical multiplexer that combines signals from one or more optical transmitters and/or optical transceivers. One or more optical signals may be carried via super-channel 265. In some implementations, a single Tx device 260 may be associated with a single super-channel 265. Additionally, or alternatively, a single Tx device 260 may be associated with multiple super-channels 265, or multiple Tx devices 260 may be associated with a single super-channel 265.

Super-channel 265 may include multiple channels multiplexed together using wavelength-division multiplexing to increase transmission capacity. Various quantities of channels may be combined into super-channels using various modulation formats to create different super-channel types having different characteristics. Additionally, or alternatively, an optical link may include a super-channel group. A super-channel group may include multiple super-channels multiplexed together using wavelength-division multiplexing to increase transmission capacity. Super-channel 265 is described in more detail herein in connection with FIG. 2C.

Multiplexer 270 may include, for example, an optical multiplexer that combines multiple input super-channels 265 for transmission over an output fiber. For example, multiplexer 270 may combine super-channels 265-1 through 265-M, and may provide the combined super-channels 265 to OADM 275 via an optical link (e.g., a fiber).

OADM 275 may include, for example, a ROADM, a FROADM, or the like. OADM 275 may multiplex, de-multiplex, add, drop, and/or route multiple super-channels 265 into and/or out of a fiber (e.g., a single mode fiber). As illustrated, OADM 275 may drop super-channel 265-1 from a fiber, and may allow super-channels 265-2 through 265-M to continue propagating toward Rx device 285. Dropped super-channel 265-1 may be provided to a device (not shown) that may demodulate and/or otherwise process super-channel 265-1 to output the data stream carried by super-channel 265-1. As illustrated, super-channel 265-1 may be provisioned for transmission from Tx device 260-1 to OADM 275, where super-channel 265-1 may be dropped. As further shown, OADM 275 may add super-channel 265-1' (e.g., 265-1$^{prime}$) to the fiber. Super-channel 265-1' may include one or more optical carriers (e.g., one or more channels) at the same or substantially the same wavelengths as super-channel 265-1. Super-channel 265-1' and super-channels 265-2 through 265-M may propagate to demultiplexer 280.

Demultiplexer 280 may include, for example, an optical de-multiplexer that separates multiple super-channels 265 carried over an input fiber. For example, demultiplexer 280 may separate super-channels 265-1' and super-channels 265-2 through 265-M, and may provide each super-channel 265 to a corresponding Rx device 285.

Rx device 285 may include, for example, an optical receiver and/or an optical transceiver that receives an optical signal. In some implementations, Rx device 285 may include an optical demodulator that demodulates the optical signal. In some implementations, Rx device 285 may include an optical demultiplexer that separates signals for transmission to one or more optical receivers and/or optical transceivers. One or more optical signals may be received by Rx device 285 via super-channel 265. Rx device 285 may convert a super-channel 265 into one or more electrical signals, which may be processed to output information associated with each data stream carried by an optical carrier (e.g., a channel) included in super-channel 265. In some implementations, a single Rx device 285 may be associated with a single super-channel 265. Additionally, or alternatively, a single Rx device 285 may be associated with multiple super-channels 265, or multiple Rx devices 285 may be associated with a single super-channel 265.

The number and arrangement of devices shown in FIG. 2B are provided as an example. In practice, there may be additional devices, fewer devices, different devices, or differently arranged devices, included in optical network 240, than those shown in FIG. 2B. Furthermore, two or more devices shown in FIG. 2B may be implemented within a single device, or a single device shown in FIG. 2B may be implemented as multiple, distributed devices. Additionally, or alternatively, a set of devices shown in FIG. 2B may perform one or more functions described as being performed by another set of devices shown in FIG. 2B.

Figure 2C:
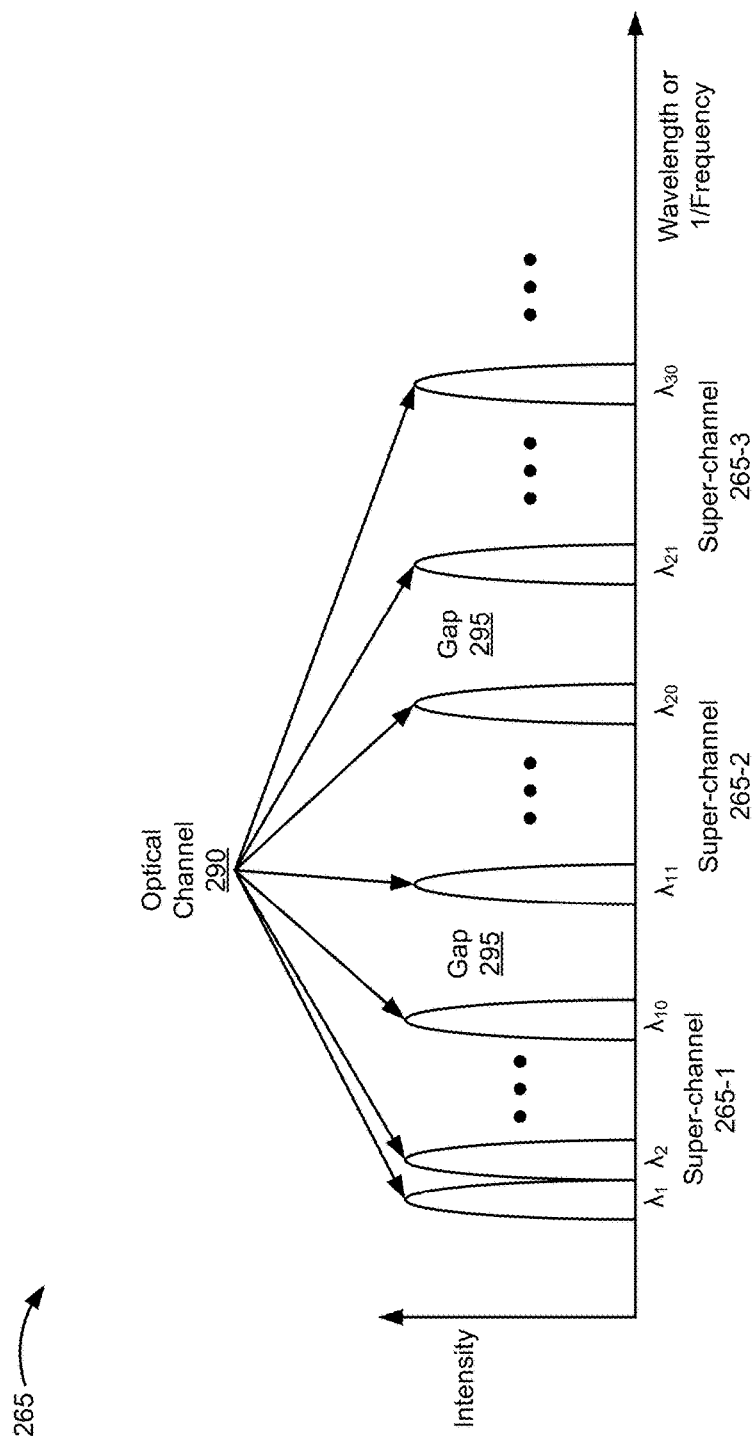
FIG. 2C is a diagram of example super-channels that may be monitored and/or configured according to implementations described herein.

FIG. 2C is a diagram of example super-channels 265 that may be monitored and/or configured according to implementations described herein. A super-channel may refer to multiple optical carriers (e.g., multiple optical channels) that are simultaneously transported, as a single optical channel, over the same optical waveguide (e.g., a single mode optical fiber). Each optical carrier included in a super-channel may be associated with a particular optical wavelength (or set of optical wavelengths). The multiple optical carriers may be combined to create a super-channel using wavelength division multiplexing. For example, the multiple optical carriers may be combined using dense wavelength division multiplexing, in which carrier-to-carrier spacing may be less than 1 nanometer. In some implementations, each optical carrier may be modulated to carry an optical signal.

FIG. 2C shows an example frequency and/or wavelength spectrum associated with super-channels 265. In some implementations, the frequency and/or wavelength spectrum may be associated with a particular optical spectrum (e.g., C Band, C+ Band, CDC Band, etc.). As shown, super-channel 265-1 may include multiple optical carriers 290, each of which corresponds to a wavelength λ (e.g., $\lambda_1$, $\lambda_2$, through $\lambda_{10}$) within a first wavelength band. Similarly, super-channel 265-M may include multiple optical carriers 290, each of which corresponds to a wavelength λ (e.g., $\lambda_{Y-X}$ through $\lambda_Y$) within a second wavelength band. The quantity of depicted optical carriers 290 per super-channel 265 is provided as an example. In practice, super-channel 265 may include any quantity of optical carriers 290. In some implementations, optical node 250 may be associated with multiple super-channels 265 (e.g., super-channels 265 used by optical node 250). These super-channels 265 may be separated by a channel gap 295, which is a spacing between successive super-channels 265. In some implementations, this spacing between successive super-channels 265 may be uniform. In some implementations, this spacing between successive super-channels 265 may be non-uniform.

Optical carrier 290 may be associated with a particular frequency and/or wavelength of light. In some implementations, optical carrier 290 may be associated with a frequency and/or wavelength at which the intensity of light carried by optical carrier 290 is strongest (e.g., a peak intensity, illustrated by the peaks on each optical carrier 290). In some implementations, optical carrier 290 may be associated with a set of frequencies and/or a set of wavelengths centered at a central frequency and/or wavelength. The intensity of light at the frequencies and/or wavelengths around the central frequency and/or wavelength may be weaker than the intensity of light at the central frequency and/or wavelength, as illustrated.

In some implementations, the spacing between adjacent wavelengths (e.g., $\lambda_1$ and $\lambda_2$) may be equal to or substantially equal to a bandwidth (or bit rate) associated with a data stream carried by optical carrier 290. For example, assume each optical carrier 290 included in super-channel 265-1 (e.g., $\lambda_1$ through $\lambda_{10}$) is associated with a 50 Gigabit per second ("Gbps" or "G") data stream. In this example, super-channel 265-1 may have a collective data rate of 500 Gbps (e.g., 50 G×10). In some implementations, the collective data rate of super-channel 265 may be greater than or equal to 100 G. Additionally, or alternatively, the spacing between adjacent wavelengths may be non-uniform, and may vary within a particular super-channel band (e.g., super-channel 265-1). In some implementations, optical carriers 290 included in super-channel 265 may be non-adjacent (e.g., may be associated with non-adjacent wavelengths in an optical spectrum).

Each super-channel 265 may be provisioned in optical network 240 as one optical channel and/or as an individual optical channel. Provisioning of an optical channel may include designating a route and/or path for the optical channel through optical network 240. For example, an optical channel may be provisioned to be transmitted via a set of optical nodes 250. In some implementations, optical nodes 250 may be configured as a ring. Additionally, or alternatively, optical nodes 250 may be configured in a point-to-point configuration. Provisioning may be referred to as "allocating" and/or "allocation" herein. Even though each super-channel 265 is a composite of multiple optical carriers 290, the optical carriers 290 included in super-channel 265 may be routed together through optical network 240. Additionally, or alternatively, super-channel 265 may be managed and/or controlled in optical network 240 as though it included one optical channel and/or one optical carrier at one wavelength.

The number and arrangement of super-channels and optical carriers shown in FIG. 2C are provided as an example. In practice, there may be additional super-channels and/or optical carriers, fewer super-channels and/or optical carriers, different super-channels and/or optical carriers, or differently arranged super-channels and/or optical carriers than those shown in FIG. 2C.

Figure 3:
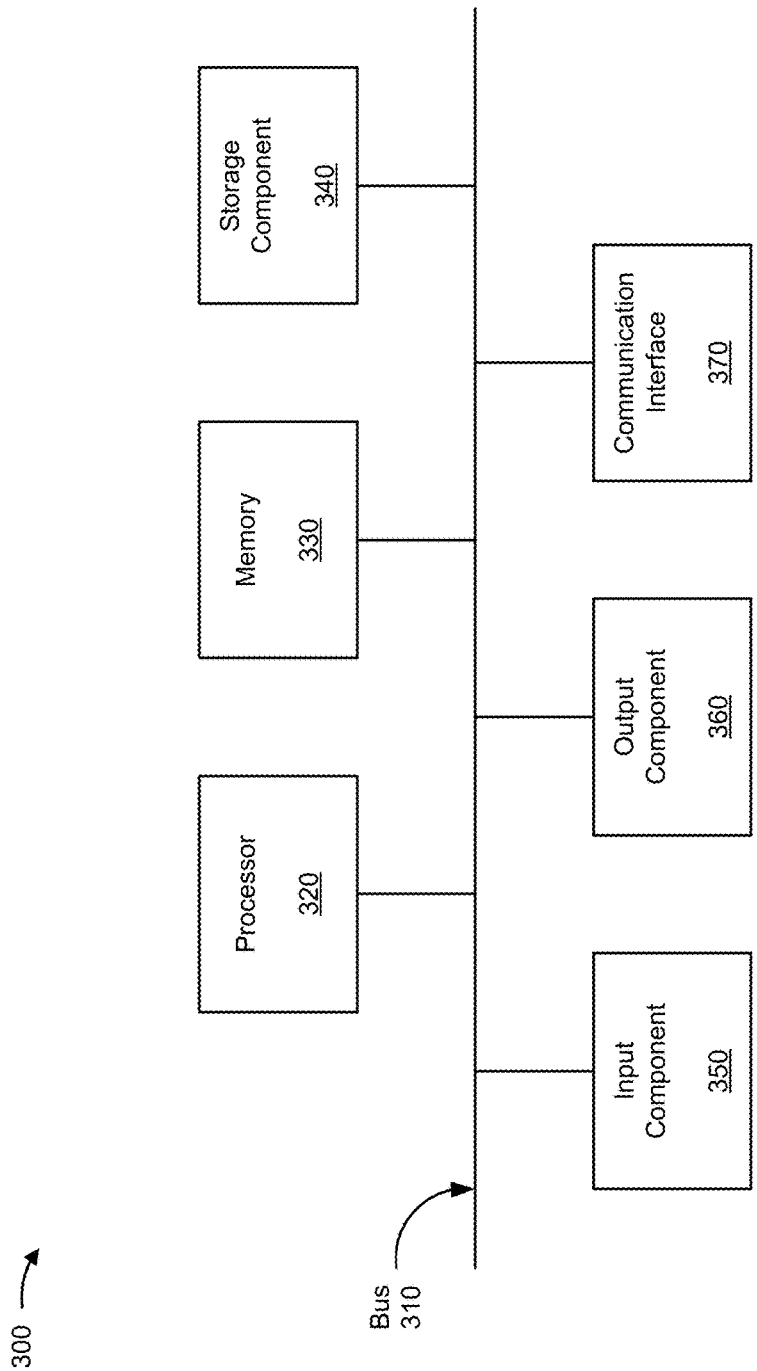
FIG. 3 is a diagram of example components of one or more devices and/or systems of FIG. 2A and/or FIG. 2B.

FIG. 3 is a diagram of example components of a device 300. Device 300 may correspond to network planning system 210, network administrator device 220, user device 230, and/or optical node 250. In some implementations, network planning system 210, network administrator device 220, user device 230, and/or optical node 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
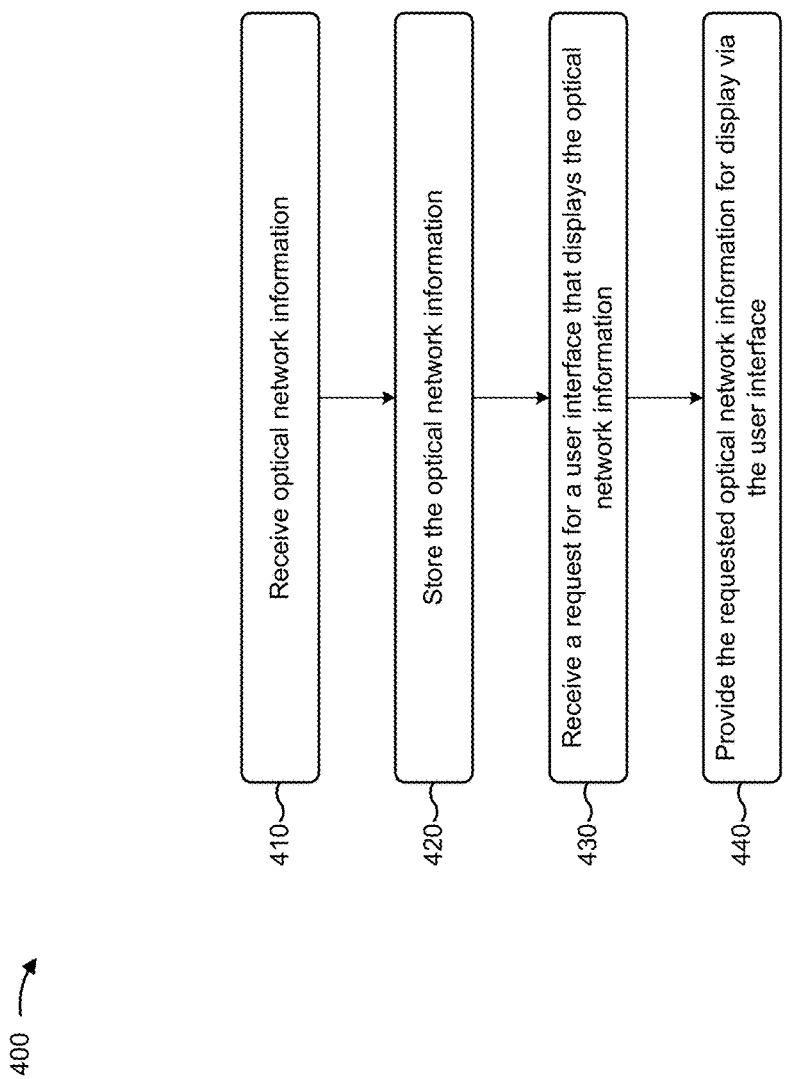
FIG. 4 is a flow chart of an example process for receiving and storing optical network information, and providing the optical network information via a user interface.

FIG. 4 is a flow chart of an example process 400 for receiving and storing optical network information, and providing the optical network information via a user interface. In some implementations, one or more process blocks of FIG. 4 may be performed by network administrator device 220. In some implementations, one or more process blocks of FIG. 4 may be performed by another device or a group of devices separate from or including network administrator device 220, such as network planning system 210, user device 230, and/or optical node 250.

As shown in FIG. 4, process 400 may include receiving optical network information (block 410). For example, network administrator device 220 may receive optical network information (e.g., from network planning system 210, optical node 250, etc.). In some implementations, network administrator device 220 may request and/or receive the optical network information on a periodic basis (e.g., every second, every minute, every hour, every day, every week, etc.). Additionally, or alternatively, network administrator device 220 may request and/or receive the optical network information based on input received from a user (e.g., a user request for the optical network information). Additionally, or alternatively, network planning system 210, and/or optical node 250 may automatically provide the optical network information to network administrator device 220 (e.g., on a periodic basis, when the optical network information is modified, etc.).

Optical network information may include information associated with optical network 240, such as information associated with one or more optical nodes 250, one or more optical components included in one or more optical nodes, one or more optical devices, one or more optical super-channels carried by one or more optical components, one or more optical channels (e.g., optical carriers) included in one or more optical super channels, one or more optical links between optical nodes 250, or the like.

For example, the optical network information may include information regarding data center interconnect nodes. A data center interconnect node may include an optical node 250, associated with a first data center, that has a point-to-point optical connection with another data center interconnect node associated with a second data center. The first data center and the second data center may both include a facility that is used to house computer systems (e.g., a group of computer systems) and associated components, such as telecommunications devices, storage devices, cloud computing devices, or the like. The first data center interconnect node may be housed by the first data center and the second data center interconnect node may be housed by the second data center. The data center interconnect node may be directly linked to the other data center interconnect node with no optical node 250 in between. A data center interconnect node may receive a payload from or send a payload to one or more client devices.

The optical network information may provide information associated with the optical channels or super-channels 265 used to communicate between the data center interconnect nodes and the optical devices associated with the data center interconnect nodes. The optical network information may include alarms indicating that the data center interconnect nodes are not configured correctly as described below. For example, the alarm may include alert information that identifies whether there is a communication mismatch associated with the first group of optical devices and the second group of optical devices (e.g., whether configurations of the first group of optical devices do not match configurations of the second group of optical devices).

As further shown in FIG. 4, process 400 may include storing the optical network information (block 420). For example, network administrator device 220 may store the optical network information in a memory accessible by network administrator device 220. In some implementations, network administrator device 220 may store the information using a data structure.

As further shown in FIG. 4, process 400 may include receiving a request for a user interface that displays the optical network information (block 430). For example, network administrator device 220 may receive a request (e.g., based on user input) for a user interface that displays optical network information associated with optical network 240. In some implementations, the optical network information may relate to a particular optical route (e.g., a set of optical nodes 250, such as data center interconnect nodes, and/or optical links on the optical route between data center interconnect nodes that directly connect data centers). For example, a user may provide input that identifies an optical route (e.g., using a button, a drop-down menu or box, a link, a text box, etc.). Additionally, or alternatively, a user may provide input that identifies optical node 250, such as a data center interconnect node. In some implementations, the user may be able to access the optical route and/or optical node 250 from different ways from the user interface.

As further shown in FIG. 4, process 400 may include providing the requested optical network information for display via the user interface (block 440). For example, network administrator device 220 may provide the requested optical network information for display via a user interface. Additionally, or alternatively, network administrator device 220 may provide the requested optical network information to another device (e.g., user device 230) for display via a user interface. In some implementations, the user interface may be divided into different sections (e.g., windows, tabs, frames, areas, etc.), and each section may provide information associated with a different layer of optical network 240.

As an example, the user interface may include a summary view that provides high-level summary information relating to multiple data center interconnect nodes and/or optical links and the associated optical channels and/or optical super-channels between the multiple data center interconnect nodes. The multiple data center interconnect nodes may correspond to multiple data centers to which the multiple data center interconnect nodes are associated. A data center interconnect node may include one or more optical connections to one or more client devices in which the data center may receive input (e.g., such as an optical signal) from the one or more client devices or transmit output (e.g., such as an optical signal) to the one or more client devices.

In some implementations, the optical connections may be associated with an optical device. The optical device may include a TX device 260 and/or an Rx Device 285 in which a payload (e.g., data that the client is transmitting or receiving) is input from a client device or output to the client device. The user interface may include information associated with the optical device (e.g., client input/output (IO) information) that includes an optical power of the optical device, a service state (e.g., whether in service or not) of the optical device, or the like.

In some implementations, the user interface may provide information that associates one or more optical devices with one or more optical channels and/or super-channels 265. An association between an optical device and an optical channel and/or super-channel 265 indicates that the payload from the optical device is being transmitted over an optical link using the optical channel and/or super-channel 265. The one or more optical channels and/or super-channels 265 may be associated with Tx device 260, which transmits optical signals over the one or more optical channels and/or super-channels 265, and Rx device 285, which receives optical signals over the one or more optical channels and/or super-channel 265. The one or more optical channels and/or super-channels 265 may also be associated with an optical channel group (e.g., a spectrum of optical channels and/or super-channels 265 grouped together). The user interface may include information associated with an optical channel and/or super-channel 265 that includes an optical power of the optical channel, a modulation type associated with the optical channel, an alarm associated with the channel, a service state of the channel, or the like.

In some implementations, the user interface may associate a first group of optical devices, which are mapped to a particular optical channel or super-channel 265 being used (e.g., corresponding to an optical channel or super-channel 265 in that the payload of the optical device is being sent using the optical channel or super-channel 265 as a carrier) by a first data center interconnect node, to a second group of optical devices, which are mapped to the particular optical channel or super-channel 265 being used by a second data center interconnect node.

In some implementations, network administrator device 220 may determine alert information that identifies whether there is a communication mismatch between the first group of optical devices and the second group of optical devices and provide the alert information to the user interface. The user interface may alert a user of abnormalities (e.g., based on the alert information) between the first group of optical devices and the second group of optical devices when the first group of optical devices and the second group of optical devices are not configured to receive payloads from one another, as described in detail in connection with FIGS. 5A-5J.

In this way, the user interface may provide optical network information associated with multiple data center interconnect nodes, such as to diagnose a problem associated with optical network 240. By providing optical network information that is associated with the multiple data center interconnect nodes, network administrator device 220 may permit a user to more easily and efficiently monitor optical network 240 and/or diagnose optical network problems associated with the multiple data center interconnect nodes.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5J are diagrams of an example implementation 500 relating to example process 400 shown in FIG. 4. FIGS. 5A-5J show example user interfaces for providing optical network information associated with data center interconnect nodes.

Figure 5A:
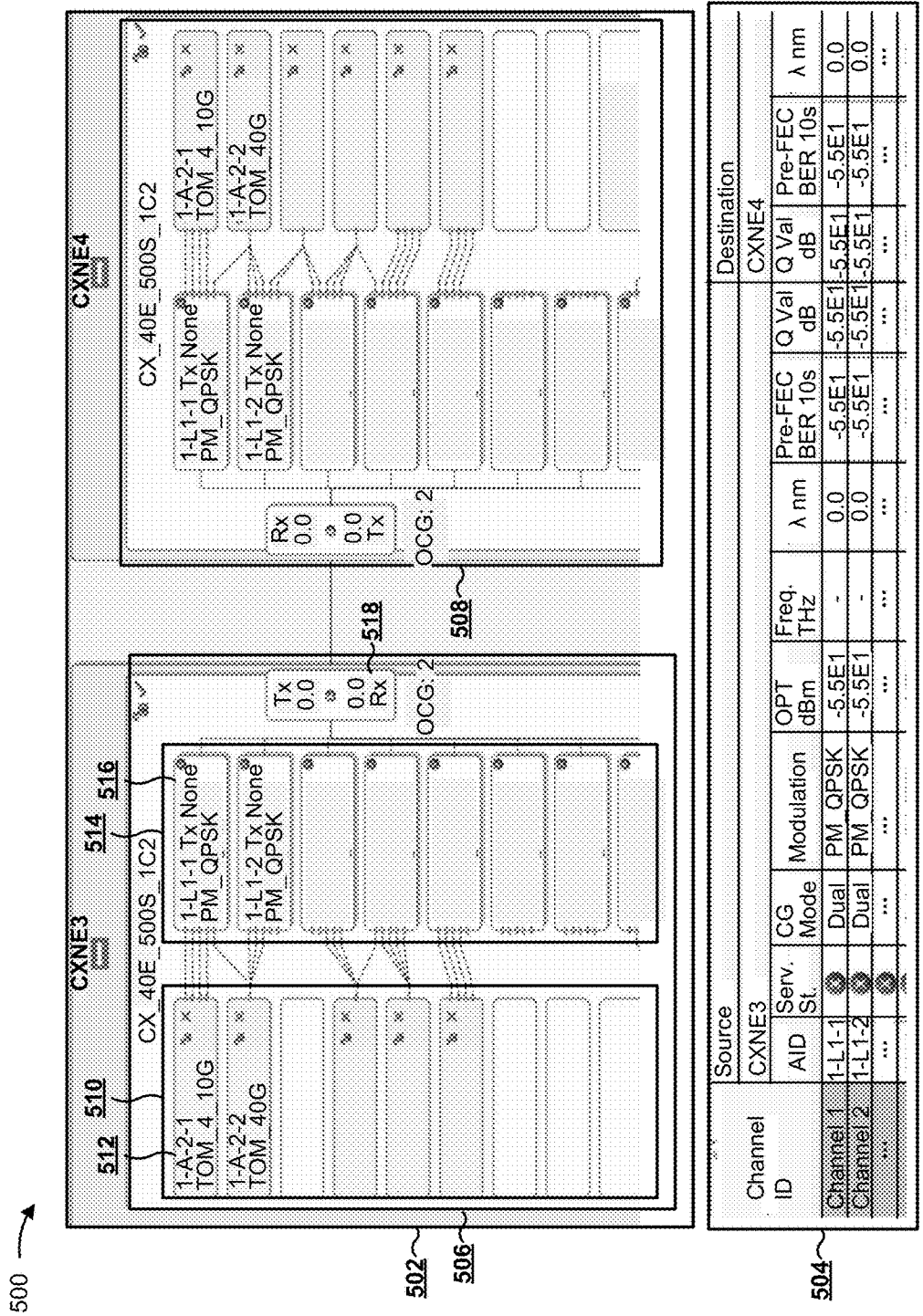
FIGS. 5A-5J are diagrams of an example implementation relating to the example process shown in FIG. 4.

As shown in FIG. 5A, user device 230 may provide a user interface that provides optical network information associated with one or more data center interconnect nodes and optical signals that are input into the data center interconnect nodes or output out of the data center interconnect nodes. The user interface may provide multiple sections, such as a graphical view (e.g., a summary view), as shown by reference number 502, and an optical channel tabular view (e.g., a channel view) as shown by reference number 504. In the example, as shown by reference number 502, the user interface provides a graphical view of two data center interconnect nodes, such as a first data center interconnect node associated with a first data center and a second data center interconnect node associated with a second data center.

As shown by reference number 506, the user interface provides a graphical view of a first data center interconnect node with an identifier of "CXNE3." As shown by reference number 508, the user interface also provides a graphical view of a second data center interconnect node with an identifier of "CXNE4."

As shown by reference number 510, the first data center interconnect node is associated with multiple optical device representations representing connections the first data center interconnect node has to client devices (e.g., connections in which information can be input from or output to client devices). As shown by reference number 512, each optical device is represented by a box (e.g., an optical device representation) in the graphical view of the data center interconnect node. The optical device representation may be associated with an optical device identifier (e.g., "1-A-2-1," as shown) and an optical device type (e.g., "TOM_4_10 G," as shown and explained in further detail below). The optical device representation may also be associated with a service state (e.g., whether the optical device is in service or out of service). An exclamation point, which is not depicted, may be displayed to indicate that the optical device is out of service. Since the optical device, shown here by the optical device representation, is in service, there is no exclamation point. Additionally, or alternatively, the optical device representation may be associated with an alarm state (e.g., an alert state) that indicates some issue with the setup of the optical device. A question mark, which is not depicted for the optical device shown by reference number 512, may be displayed to indicate an alert. Since the optical device shown here has no alert, there is no question mark associated with the optical device representation. Alerts are discussed in more detail below.

As shown by reference number 514, the first data center interconnect node is associated with multiple channel representations representing optical channels and/or super-channels 265 used by the first data center interconnect node to transmit or receive optical signals from the optical devices. The optical channels and/or super-channels 265 associated with the first data center interconnect node may correspond to optical channels and/or super-channels 265 associated with the second data center interconnect node, as described in detail below. As shown by reference number 516, each optical channel and/or super-channel 265 is represented by a box (e.g., a channel representation) in the graphical view of the data center interconnect node. The channel representation may be associated with a channel identifier (e.g., "1-L1-1," as shown), an optical power transmitted (shown in association with "Tx" and represented here as "none"), and a modulation type ("PM_OPSK"). In some implementations, the channel representation may be associated with an optical power received (which may be shown as "Rx"). The optical power transmitted or the optical power received may be in decibel watts (dBW), decibel milliwatts (dBm), or the like. The channel representation may also be associated with a service state and/or an alert state, as described above. As shown, the optical channel has no alert and is in service because additional items are not displayed in association with the channel representation.

As shown by reference number 518, the group of channels is associated with a box that represents information associated with an optical channel group (e.g., a channel group representation). The channel group representation is associated with an optical power received ("Rx"), an optical power transmitted ("Tx,"), and an optical channel group (shown as "OCG" under the channel group representation). The OCG in this example is 2, and the optical power transmitted and the optical power received is 0.

As shown by reference number 504, the user interface includes an optical channel tabular view. The optical channel tabular view is another way in which information associated with the data center interconnect nodes may be displayed. The optical channel tabular view may provide information associated with the optical channels and super-channels 265 used between the first data center interconnect node and the second data center interconnect node. The information associated with the channels may include, for example, an optical power, a modulation type, a frequency, a wavelength, or the like.

Figure 5B:
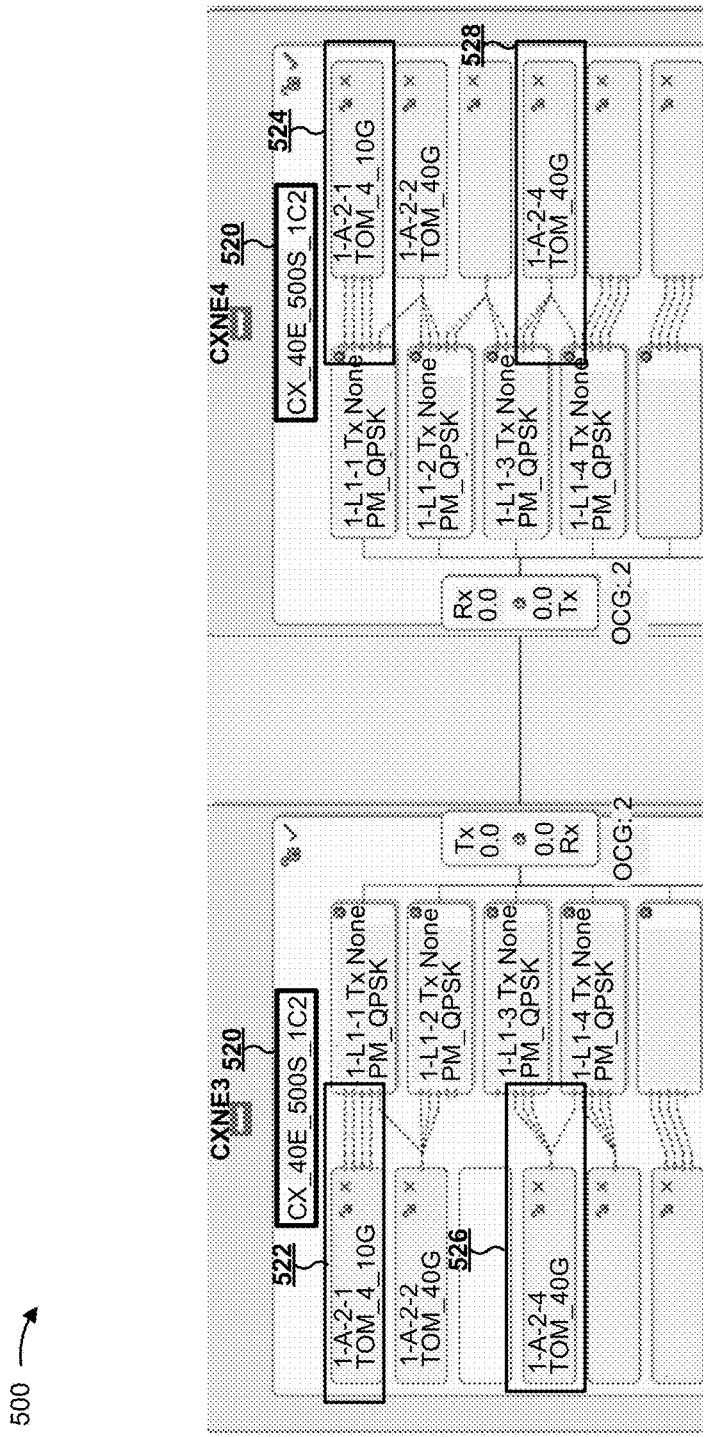

As shown in FIG. 5B, and by reference number 520, the first data center interconnect node and the second data center interconnect node of the user interface have a configuration identifier. The configuration identifier is "CX_40E_500S_1C2." The configuration identifier provides information associated with a configuration and associated with equipment of the data center interconnect node. The designation "CX" used at the start of the configuration identifier represents that the equipment is a data center interconnect node. The designation "40E" represents that the optical devices have 40 G of total capacity (e.g., the capacity could be split into four parts each with a capacity of 10 G). The designation "500s" represents that the optical channels and/or super-channels 265 transmit at a combined data rate of 500 G (e.g., there are 10 optical channels and/or super-channels 265 each with a data rate of 50 G).

As shown by reference number 522, an optical device representation associated with the first data center interconnect node with the optical device identifier of "1-A-2-1" has an optical device type of "TOM_4_10_G." This optical device type indicates that the optical device representation represents an optical device with the ability to handle four 10 G payloads. Each payload is independent and may represent data to and from a different client device. As shown, the optical device representation has four connections on the right side that map to a channel representation with the channel identifier "1-L1-1," as shown. Each connection represents a 10 G of a payload from the optical device. Since each channel has a 50 G capacity, the 1-L1-1 channel can be mapped to the 1-A-2-1 optical device and still have a connection to another optical device ("1-A-2-2," as shown"). As shown, the first four connections (from top to bottom) on the 1-L1-1 channel are mapped to the 1-A-2-1 optical device and the fifth connection is mapped to the 1-A-2-2 optical device. In other words, a payload from the 1-A-2-1 will be sent over the 1-L1-1 channel and a payload from the 1-A-2-2 optical device will be sent over the 1-L1-1 channel (10 G of the payload) and the 1-L1-2 channel (30 G of the payload).

As shown by reference number 524, an optical device representation associated with the second data center interconnect node with an optical device identifier of "1-A-2-1" has an optical device type of "TOM_4_10_G." The optical device representation has the same identifier as the optical device representation from the first data center interconnect node, as shown by reference number 522. Likewise, the optical device representation is mapped to a 1-L1-1 channel representation with four connections representing the four 10 G payloads (e.g., as shown, the first four connections associated with the channel representation). Since the 1-A-2-1 optical device from the first data center interconnect node and the 1-A-2-1 optical device from the second data center interconnect node are of the same type and have the same mapping to the 1-L1-1 channel, then the data center interconnect nodes are configured properly to allow the optical devices to be used to input optical signals from client devices or output optical signals to client devices.

As shown by reference numbers 526 and 528, an optical device representation associated with the first data center interconnect node and an optical device representation associated with the second data center interconnect node both have an optical device identifier of "1-A-2-4" and an optical device type of "TOM_40 G." This optical device type indicates that the optical device representation represents an optical device with a 40 G capacity (e.g., the optical device can accept a payload of up to 40 G). The optical device representation associated the first data center interconnect node and the optical device representation associated with the second data center interconnect node both map to the last three connections of the 1-L1-3 channel representation and the first connection of the 1-L1-4 channel representation. Since the 1-A-2-4 optical devices have the same type and the same mappings (e.g., identical mappings), then the data center interconnect nodes are configured properly to allow the optical devices to be used to input optical signals from client devices or output optical signals to client devices.

Figure 5C:
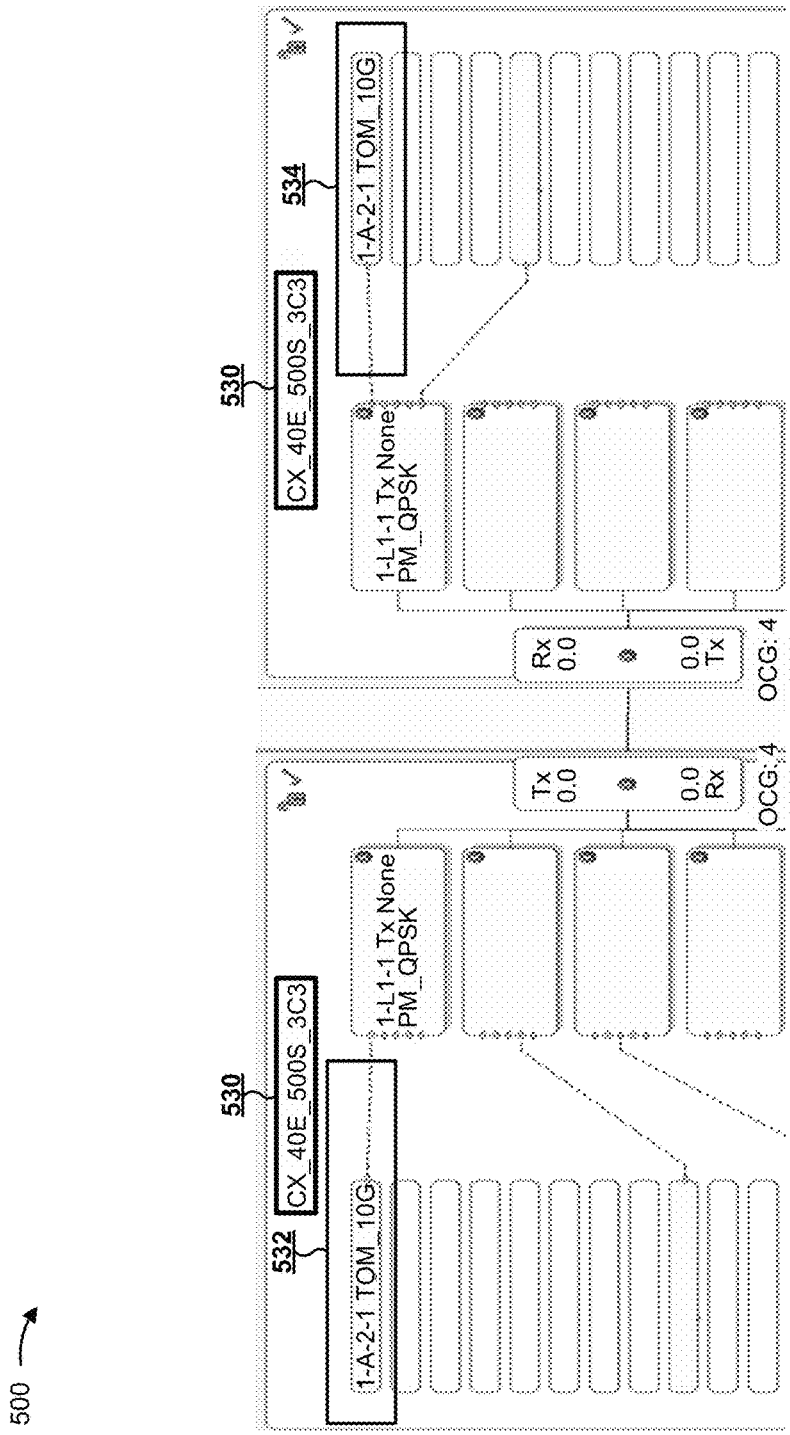

As shown in FIG. 5C, and by reference number 530, the configuration identifier for the first data center interconnect node and the second data center interconnect node are "CX_10E_500S_3C3." The configuration identifier identifies that the data center interconnect nodes have optical devices with 10 G of total capacity and optical channels and/or super-channels 265 with a 500 G combined data rate (e.g., each of the ten optical channels and/or super-channels 265 has a 50 G data rate). As shown by reference number 532 and reference number 534, an optical device representation associated with the data center interconnect node and an optical device representation associated with the second data center interconnect node both have an optical device identifier of "1-A-2-1" and an optical device type of "TOM_10 G." This optical device type indicates that the optical device representation represents an optical device with one 10 G capacity. Both 1-A-2-1 optical device representations are mapped to a first connection on the 1-L1-1 channel representation. Since the 1-A-2-1 optical devices have the same type and the same mappings, then the data center interconnect nodes are configured properly to allow the optical devices to be used to input optical signals from client devices or output optical signals to client devices.

Figure 5D:
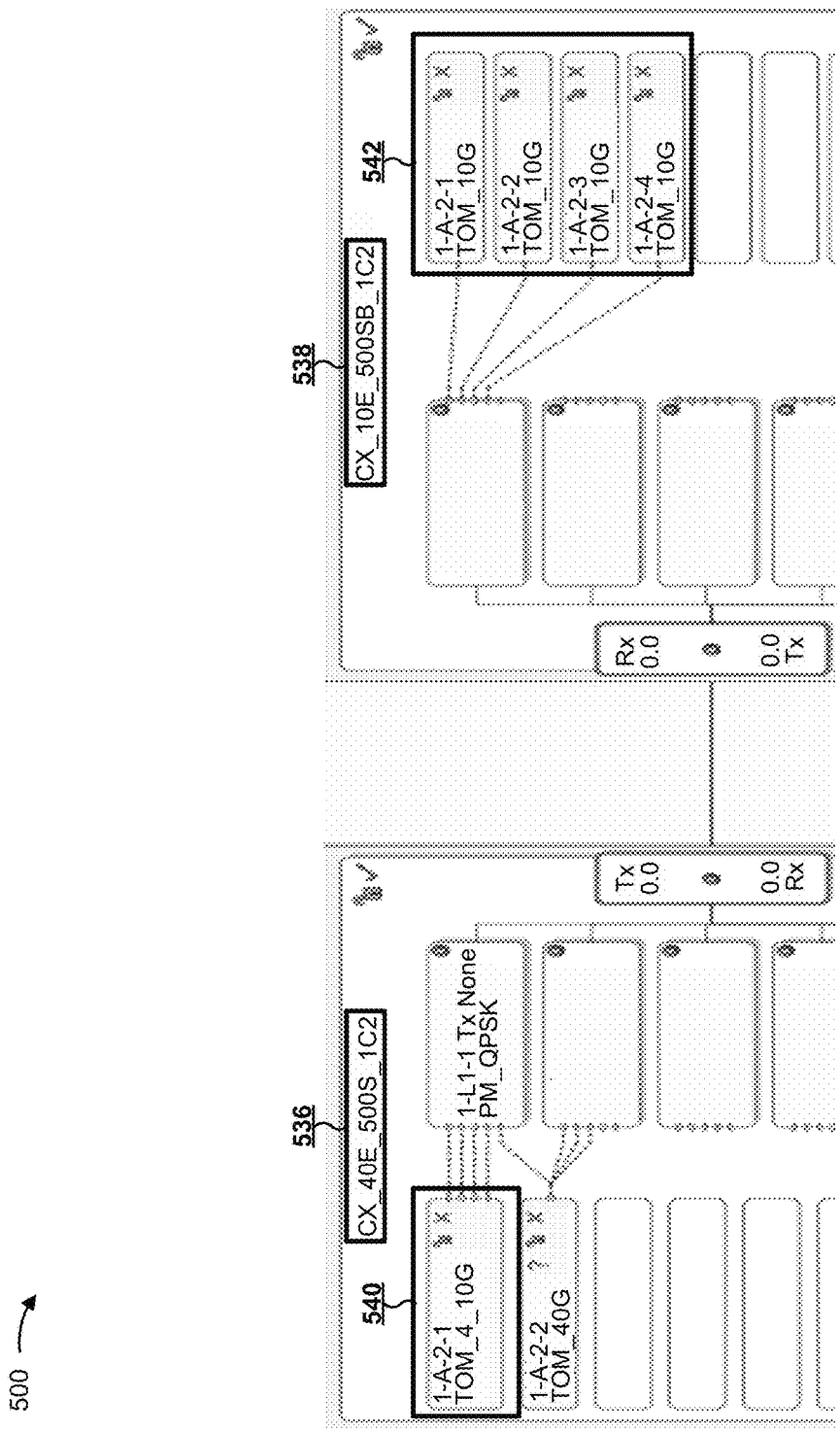

As shown in FIG. 5D, and by reference number 536, the configuration identifier for the first data center interconnect node is "CX_40E_500S_1C2." The configuration identifier identifies that the first data center interconnect node has optical devices with 40 G total capacity and optical channels and/or super-channels 265 with a combined 500 G data rate. As shown by reference number 538, the configuration identifier for the second data center interconnect node is "CX_10E_500S_1C2." The configuration identifier identifies that the second data center interconnect node has optical devices with a 10 G capacity and optical channels and/or super-channels 265 with a combined 500 G data rate. As shown by reference number 540, a 1-A-2-1 optical device representation associated with the first data center interconnect node represents an optical device with four separate 10 G capacities that are mapped to the first four connections of a 1-L1-1 channel representation. As shown by reference number 542, there are four 1-A-2-1 optical device representations associated with the second data center interconnect node. Each of the 1-A-2-1 optical device representations associated with the second data center interconnect node are optical devices with a 10 G capacity and the four 1-A-2-1 optical device representations are mapped to the first four connections of a 1-L1-1 channel representations. Since the 1-A-2-1 optical devices in the first data center interconnect node have four 10 G capacities and since the four 1-A-2-1 optical devices in the second data center interconnect node have a total of four 10 G capacities, then the data center interconnect nodes are configured properly to allow the optical devices to be used to input optical signals from client devices or output optical signals to client devices.

Figure 5E:
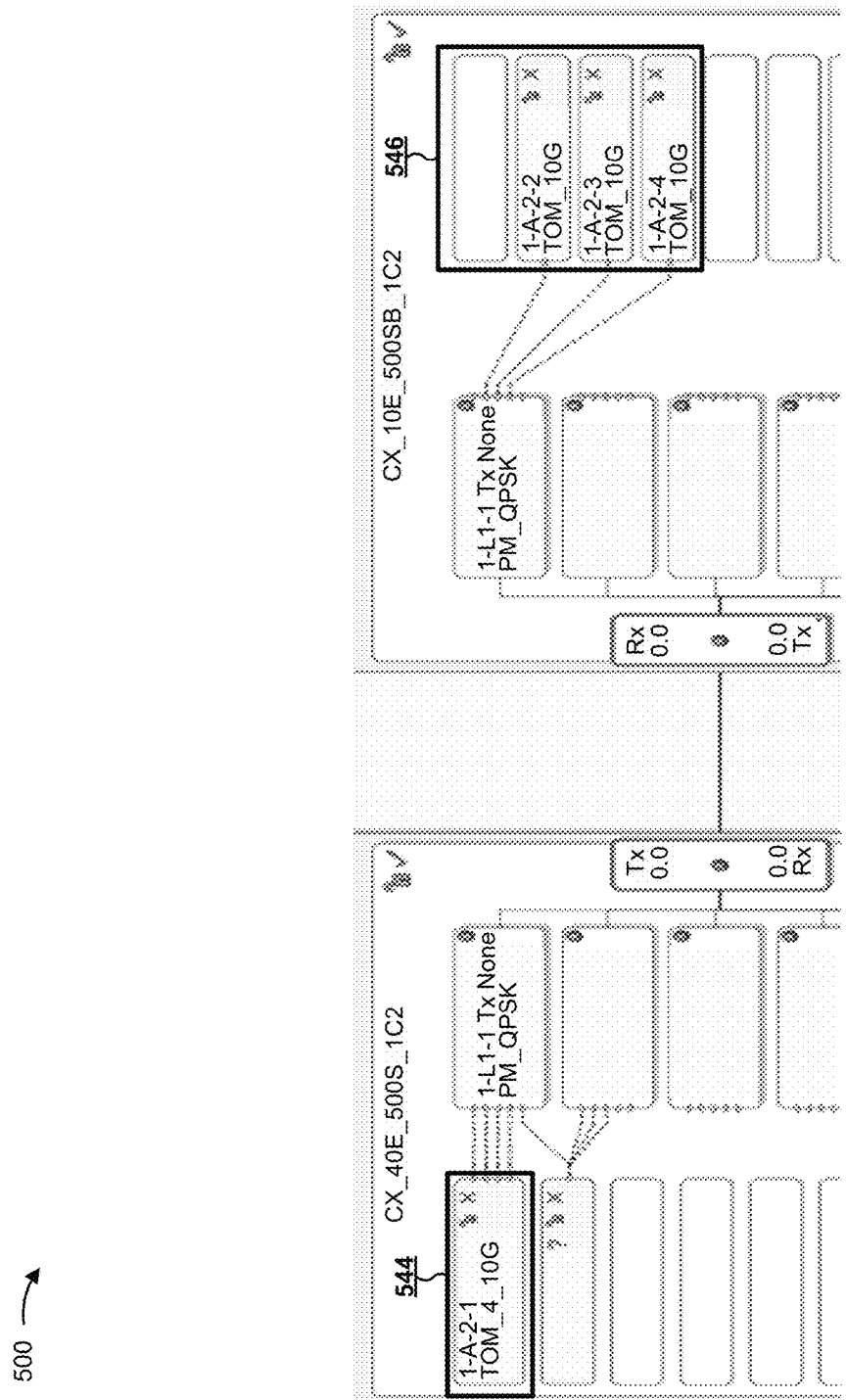

As shown in FIG. 5E, and by reference number 544, a 1-A-2-1 optical device representation associated with the first data center interconnect node represents an optical device with four separate 10 G capacities that are mapped to the first four connections of a 1-L1-1 channel representation. As shown by reference number 546, there are three 1-A-2-1 optical device representations associated with the second data center interconnect node. Each of the 1-A-2-1 optical device representations associated with the second data center interconnect node represent optical devices with a 10 G capacity and the three 1-A-2-1 optical device representations are mapped to the second, third, and fourth connections of a 1-L1-1 channel representation. Since there are only three 1-A-2-1 optical device representations associated with the second data center interconnect node and no optical device representation is connected to the first connection of the 1-L1-1 channel representation associated with the second data center interconnect node, then the capacities between the first data center interconnect node and the second data center interconnect node do not match between the 1-A-2-1 optical devices. The first data center interconnect node has optical devices with four 10 G capacities and the second data center interconnect node has optical devices with only three 10 G capacities. Therefore, the 1-A-2-2 optical device representations from both data center interconnect nodes display a question mark (e.g., a representation of an alert) to indicate that there is an alert based on the optical devices being configured incorrectly (e.g., having a configuration mismatch).

Figure 5F:
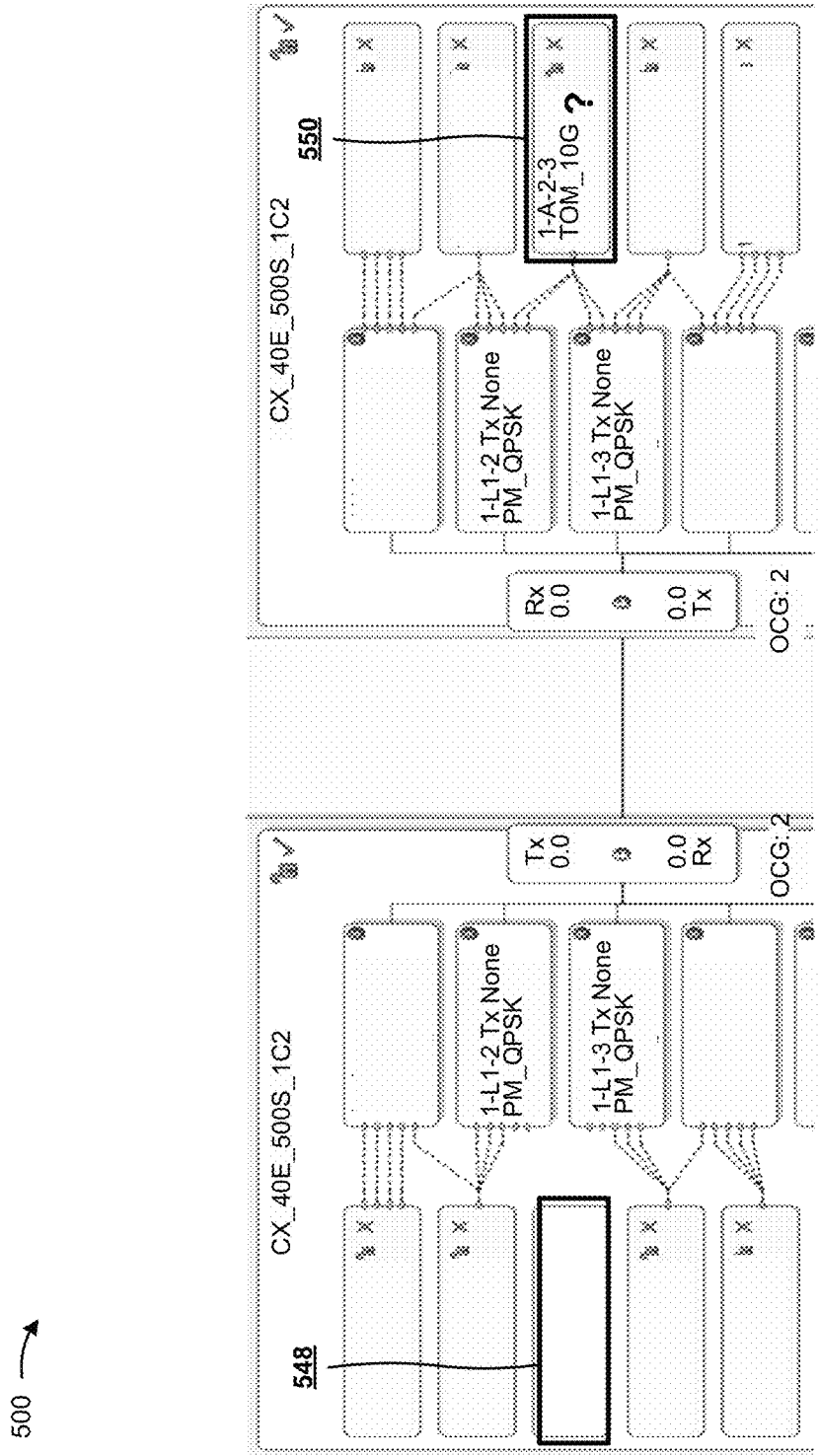

As shown in FIG. 5F, and by reference numbers 548 and 550, the second data center interconnect node is associated with a 1-A-2-3 optical device representation that represents an optical device with a 40 G capacity, but the first data center interconnect node is not associated with a corresponding optical device representation mapped to the same channel representation and instead displays a blank spot instead of an optical device representation. Because there is no corresponding optical device associated with the first data center interconnect node, the 1-A-2-3 optical device representation displays a representation of an alert, and therefore the payload associated with the 1-A-2-3 optical device may not be received or transmitted to the first data center interconnect node.

Figure 5G:
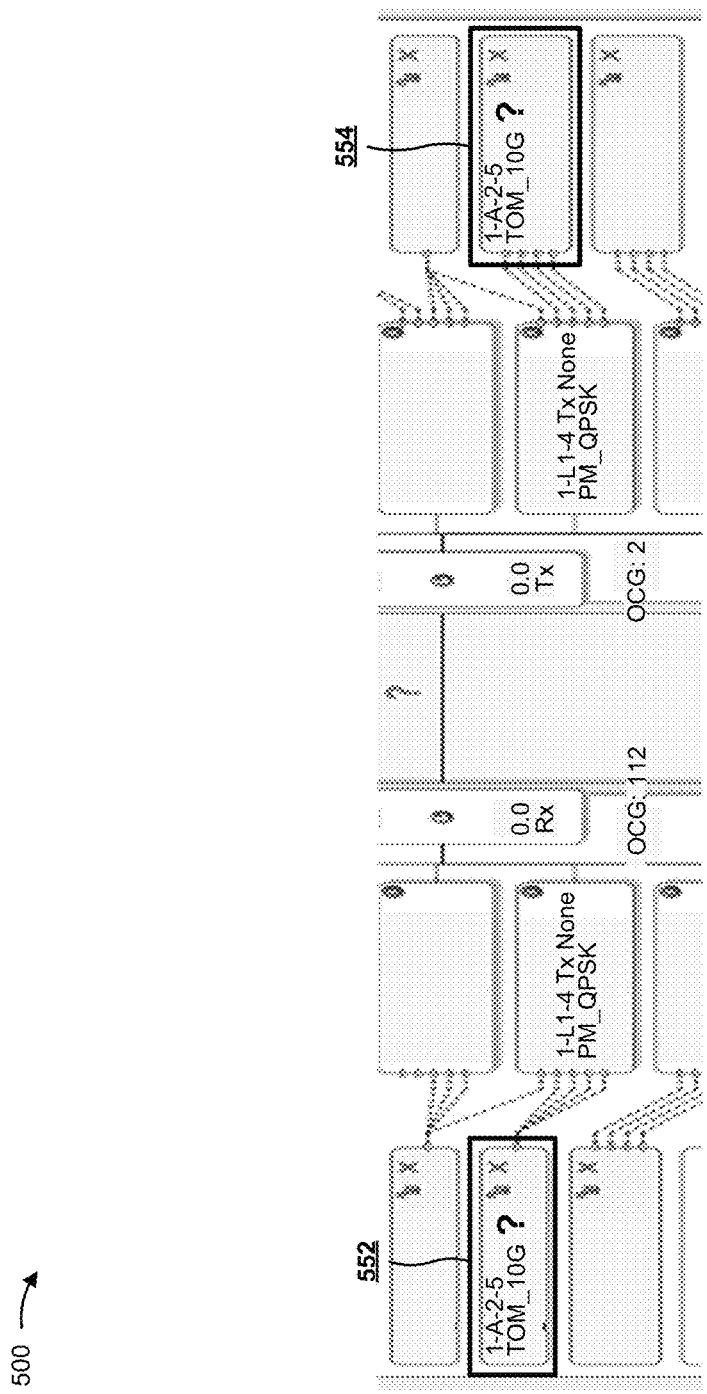

As shown in FIG. 5G, and by reference number 552, the first data center interconnect node is associated with a 1-A-2-5 optical device representation that represents an optical device with a 40 G capacity. As shown by reference number 554, the second data center interconnect node is associated with a 1-A-2-5 optical device representation that represents an optical device with four 10 G capacities. The 1-A-2-5 optical device representations have the same connections to corresponding 1-L1-4 channel representations. However, the optical device types of the 1-A-2-5 optical devices are not compatible as the 1-A-2-5 optical devices of the first data center interconnect node and the second data center interconnect node are at different capacities. Because the 1-A-2-5 optical devices are at different capacities (e.g., a 40 G capacity as compared to four 10 G capacities), the 1-A-2-5 optical device representations display a question mark to signify an alert.

Figure 5H:
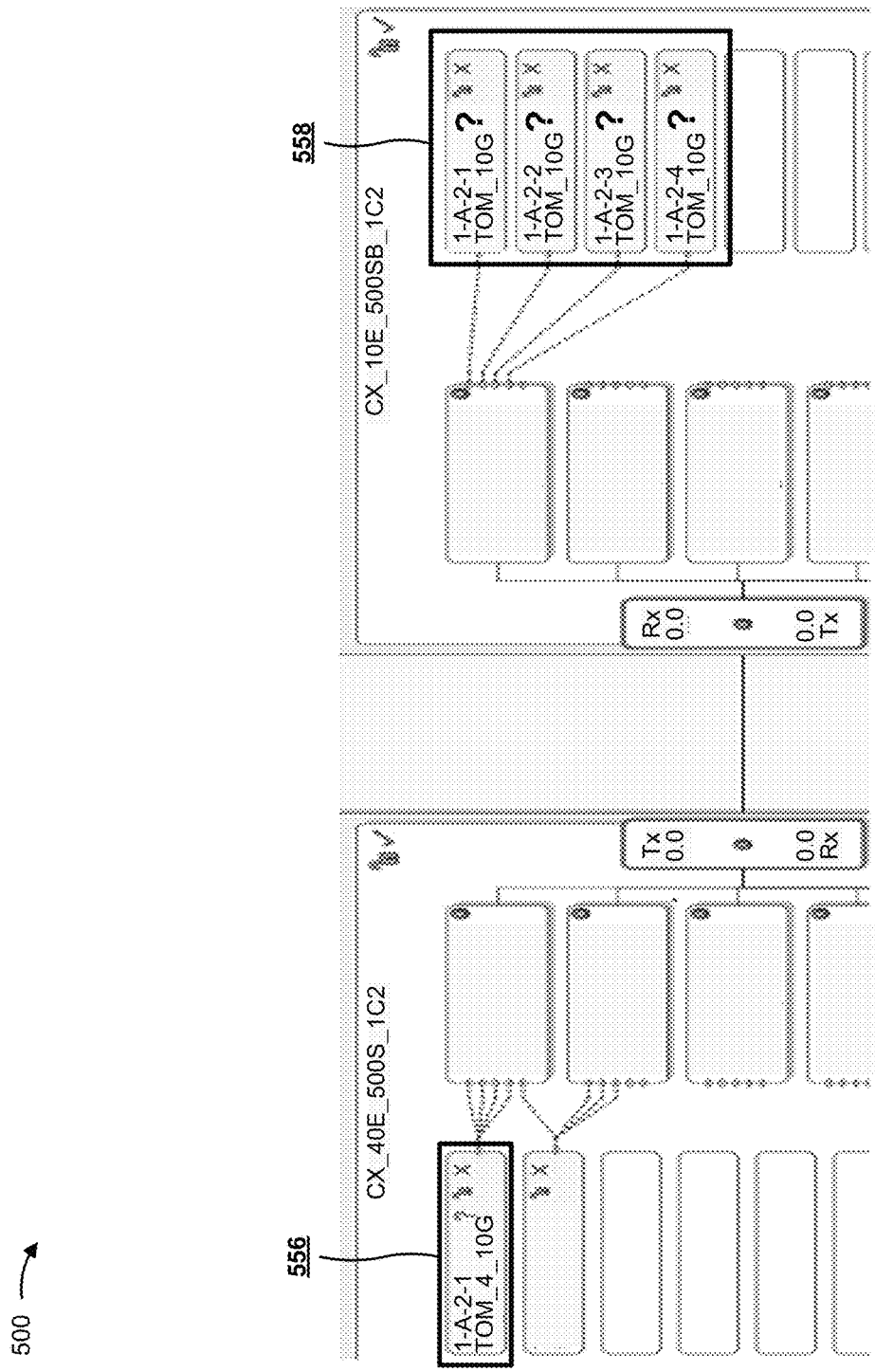

As shown in FIG. 5H, and by reference number 556, the first data center interconnect node is associated with a 1-A-2-1 optical device representation that represents an optical device with a 40 G capacity. As shown by reference number 558, the second data center interconnect node is associated with four 1-A-2-1 optical device representations that represents four optical devices with a 10 G capacity. The 1-A-2-1 optical device representation from the first data center interconnect node has the same connections to corresponding 1-L1-1 channel representation that the four 1-A-2-1 optical device representations from the second data center interconnect node have. However, the optical device type of the 1-A-2-1 optical device from the first data center interconnect node is not compatible with the optical device types of the 1-A-2-5 optical devices from the second data center interconnect node, which send and receive payloads at different capacities (e.g., the first data center interconnect node has an optical device with a capacity of 40 G and the second data center interconnect node has four optical devices with a capacity of 10 G). Because the 1-A-2-1 optical devices have different capacities, the 1-A-2-1 optical device representations display a question mark to signify an alert.

Figure 5I:
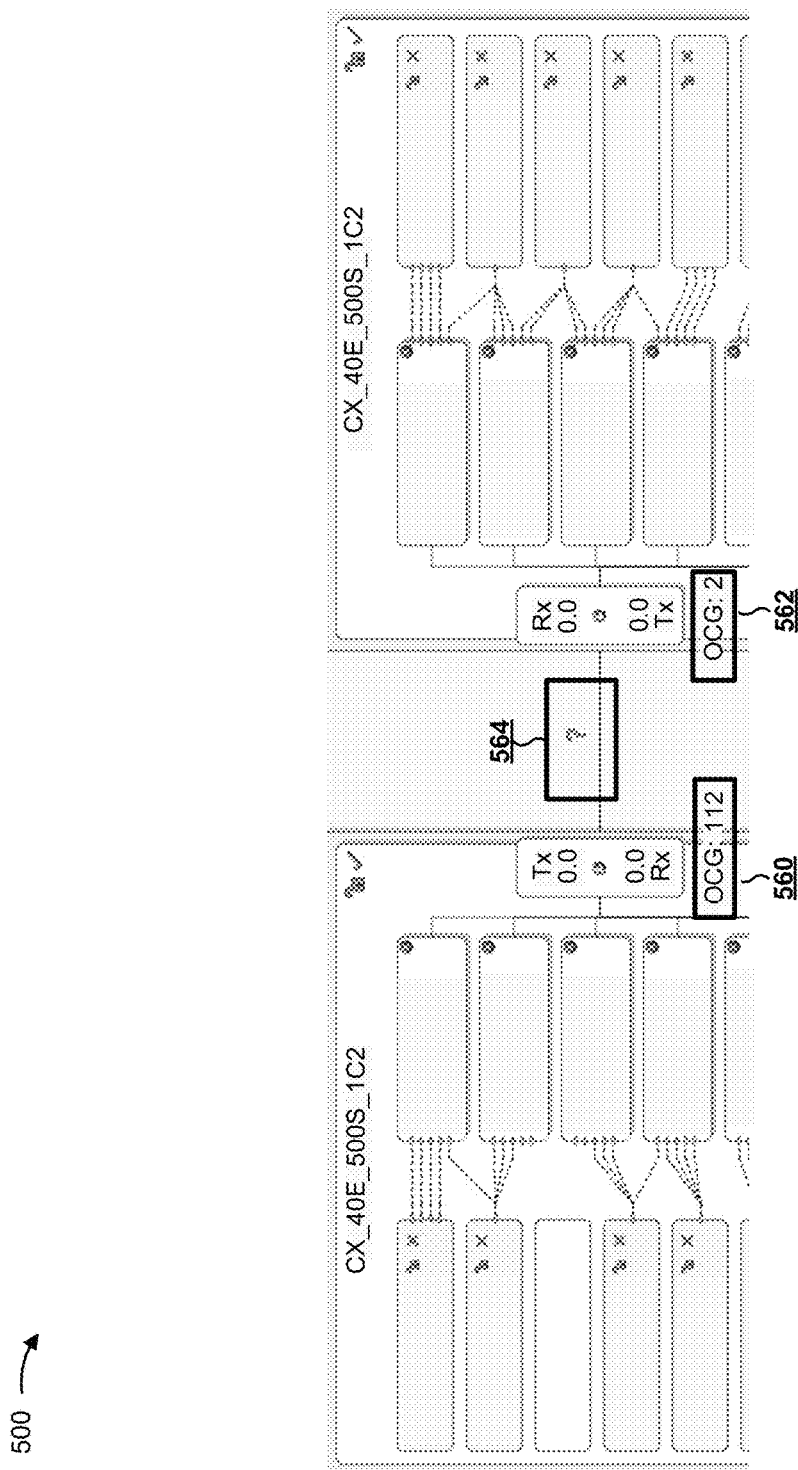

As shown in FIG. 5I, and by reference number 560, the first data center interconnect node is using optical channel group 112. As shown by reference number 562, the second data center interconnect node is using optical channel group 2. The first data center interconnect node and the second data center interconnect node are on different channel groups and are therefore not be able to transmit and receive data from each other. As shown by reference number 564, the connection between the first data center interconnect node and the second data center interconnect node is associated with a question mark. The question mark shows there is an alert associated with the connection between the first data center interconnect node and the second data center interconnect node (e.g., that the first data center interconnect node and the second data center interconnect node are on different optical channel groups).

Figure 5J:
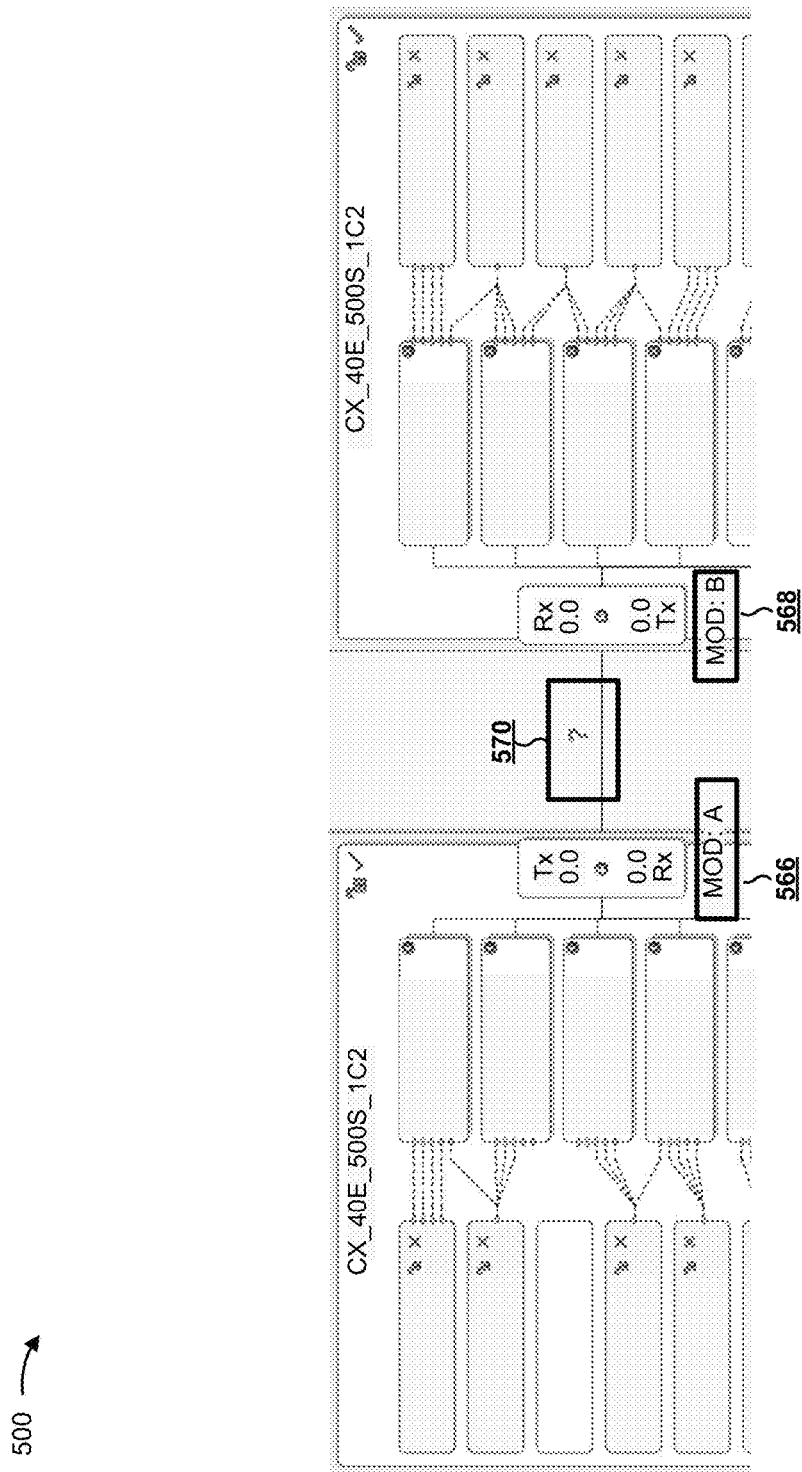

As shown in FIG. 5J, and by reference number 566, the first data center interconnect node is using modulation format A. As shown by reference number 568, the second data center interconnect node is using modulation format B. The first data center interconnect node and the second data center interconnect node are using different modulation formats and are therefore not be able to transmit and receive data from each other. As shown by reference number 570, the connection between the first data center interconnect node and the second data center interconnect node is associated with a question mark. The question mark shows there is an alert associated with the connection between the first data center interconnect node and the second data center interconnect node (e.g., that the first data center interconnect node and the second data center interconnect node are using different modulation formats).

As indicated above, FIGS. 5A-5J are provided merely as an example. Other examples are possible and may differ from what was described with regard to FIGS. 5A-5I.

Implementations described herein provide a user interface with optical network information associated with one or more data center interconnect nodes. The optical network information associated with the one or more data center interconnect nodes may include information associated with payloads of one or more client devices that are being input or output to the system. The optical network information may be used to determine if the data center interconnect nodes are correctly configured or are experiencing a communication mismatch, allowing operators to troubleshoot and repair issues associated with the data center interconnect nodes. Therefore, implementations described herein improve the operation of the optical network and of optical devices operating in the optical network by making the optical network operate more efficiently and with fewer configuration issues. Furthermore, implementations described herein provide input mechanisms for the user to easily navigate between the different sections of the user interface, to help the user find relevant optical network information associated with data center interconnect nodes.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "group" or "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors configured to:
   receive optical network information associated with a first optical node and a second optical node,
   the first optical node being associated with a first group of optical devices corresponding to a first group of payloads,
   the second optical node being associated with a second group of optical devices corresponding to a second group of payloads;
   identify a first mapping in which a first group of optical channels is associated with the first group of optical devices, the first group of optical channels carrying the first group of payloads from the first group of optical devices;

identify a second mapping in which a second group of optical channels is associated with the second group of optical devices, the second group of optical channels carrying the second group of payloads from the second group of optical devices;

determine alert information that identifies whether there is a communication mismatch between the first group of optical devices and the second group of optical devices; and provide, for display, information depicting the first mapping, information depicting the second mapping, and the alert information, where the alert information is based on a first optical device, of the first group of optical devices, that does not correspond to a second optical device of the second group of optical devices, where the first optical device corresponds to the second optical device when the first optical device and the second optical device are associated with a particular optical channel that is included in the first group of optical channels and the second group of optical channels.

2. The device of claim 1, where the communication mismatch includes one or more of a capacity mismatch, a wavelength mismatch, or a modulation mismatch.

3. The device of claim 1, where the first optical node is associated with a first group of computer systems;
where the second optical node is associated with a second group of computer systems; and
where the first optical node and the second optical node provide a point-to-point optical connection between the first group of computer systems and the second group of computer systems.

4. The device of claim 1, where the one or more processors are further configured to:
identify an alert associated with the first optical node or the second optical node based on the first mapping and the second mapping; and
provide other information that identifies the alert.

5. The device of claim 1, where the communication mismatch is a capacity mismatch where the first optical node is configured to transmit at a first data rate and the second optical node is configured to transmit at a second data rate,
the first data rate being different from the second data rate.

6. The device of claim 1, where the communication mismatch is a wavelength mismatch where the first optical node is configured to use a first optical channel group and the second optical node is configured to use a second optical channel group,
the first optical channel group being different from the second optical channel group.

7. The device of claim 1, where the communication mismatch is a modulation mismatch where the first optical node is configured to use a first modulation format and the second optical node is configured to use a second modulation format,
the first modulation format being different from the second modulation format.

8. A method, comprising:
receiving, by a device, optical network information associated with a first optical node and a second optical node,
the first optical node being associated with a first group of optical devices, corresponding to a first group of payloads,
the first optical node being associated with the second optical node, and
the second optical node being associated with a second group of optical devices corresponding to a second group of payloads;
identifying, by the device, a first mapping in which a first group of optical channels is associated with the first group of optical devices,
the first group of optical channels being provisioned to carry the first group of payloads from the first group of optical devices;
identifying, by the device, a second mapping in which a second group of optical channels is associated with the second group of optical devices,
the second group of optical channels being provisioned to carry the second group of payloads from the second group of optical devices;
providing, for display and by the device, information depicting the first mapping that is associated with the first optical node;
providing, for display and by the device, information depicting the second mapping that is associated with the second optical node;
identifying, by the device, an alert associated with the first optical node or the second optical node based on the first mapping and the second mapping; and
providing, for display and by the device, information that identifies the alert,
where the alert is based on a first optical device, of the first group of optical devices, that does not correspond to a second optical device of the second group of optical devices,
where the first optical device corresponds to the second optical device when the first optical device and the second optical device are associated with a particular optical channel that is included in the first group of optical channels and the second group of optical channels.

9. The method of claim 8, where the first group of optical channels includes an optical channel that is included in the second group of optical channels.

10. The method of claim 8, where the first optical node is associated with a first group of computer systems;
where the second optical node is associated with a second group of computer systems; and
where the first optical node has a point-to-point optical connection with the second optical node that connects the first group of computer systems and the second group of computer systems.

11. The method of claim 8, where the alert is based on a first optical device, of the first group of optical devices, being associated with a different data rate, optical channel group, or modulation format than a second optical device of the second group of optical devices.

12. The method of claim 8, where the alert is based on a communication mismatch between the first optical node and the second optical node,
the communication mismatch including one or more of a capacity mismatch, a wavelength mismatch, or a modulation mismatch.

* * * * *